US008323026B2

(12) United States Patent  
Do et al.

(10) Patent No.: US 8,323,026 B2
(45) Date of Patent: Dec. 4, 2012

(54) INTERACTIVE RECIPE PREPARATION USING INSTRUCTIVE DEVICE WITH INTEGRATED ACTUATORS TO PROVIDE TACTILE FEEDBACK

(75) Inventors: Lydia Mai Do, Raleigh, NC (US); Travis M. Grigsby, Austin, TX (US); Pamela Ann Nesbitt, Tampa, FL (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 12/103,350

(22) Filed: Apr. 15, 2008

(65) Prior Publication Data

US 2009/0258332 A1    Oct. 15, 2009

(51) Int. Cl.
*G09B 19/24* (2006.01)
*A21B 1/00* (2006.01)
*A21B 3/10* (2006.01)

(52) U.S. Cl. .......... 434/127; 434/118; 726/25; 219/385; 219/391

(58) Field of Classification Search .................. 434/127; 219/385, 391
See application file for complete search history.

(56) References Cited

U.S. PATENT DOCUMENTS

| | | | | | |
|---|---|---|---|---|---|
| 3,569,656 | A | * | 3/1971 | White et al. | 219/685 |
| 4,158,432 | A | * | 6/1979 | Van Bavel | 714/46 |
| 4,164,789 | A | * | 8/1979 | Toyomura et al. | 708/170 |
| 4,206,336 | A | * | 6/1980 | Cunningham | 219/622 |
| 4,240,721 | A | * | 12/1980 | Drop, Sr. | 353/74 |
| 4,255,639 | A | * | 3/1981 | Kawabata et al. | 219/710 |
| 4,295,027 | A | * | 10/1981 | Zushi et al. | 219/712 |
| 4,309,584 | A | * | 1/1982 | Terakami | 219/720 |
| 4,345,132 | A | * | 8/1982 | Takase et al. | 219/714 |
| 4,375,586 | A | * | 3/1983 | Ueda | 219/714 |
| 4,390,766 | A | * | 6/1983 | Horinouchi | 219/718 |
| 4,418,262 | A | * | 11/1983 | Noda | 219/720 |
| 4,503,502 | A | * | 3/1985 | Chapin | 700/90 |
| 4,517,429 | A | * | 5/1985 | Horinouchi | 219/708 |
| 4,568,810 | A | * | 2/1986 | Carmean | 219/720 |
| 4,572,935 | A | * | 2/1986 | Karino | 219/710 |
| 4,651,877 | A | * | 3/1987 | Adrianus de Mooy | 206/459.5 |
| 4,725,948 | A | * | 2/1988 | Mierzwinski | 700/90 |
| 4,780,588 | A | * | 10/1988 | Edamura | 219/714 |

(Continued)

FOREIGN PATENT DOCUMENTS

WO    WO 03/031876 A1    4/2003

*Primary Examiner* — Nikolai A Gishnock
(74) *Attorney, Agent, or Firm* — VanLeeuwen & VanLeeuwen; Jeffrey S. LaBaw

(57) ABSTRACT

An interactive cooking preparation device that includes a flexible horizontal display surface is presented. A set of actuators located under the flexible horizontal display surface that, when activated, cause a tactile sensation on the display surface. A user selects a recipe from a list of recipes. A set of preparation steps that correspond to the selected recipe are retrieved from a data store. Each of the preparation steps are displayed to the user on the flexible horizontal surface display. A current preparation step that is being performed by the user is identified. The user is directed to an area of the interactive cooking preparation device using a tactile feedback mechanism. The tactile feedback mechanism causes a physical sensation on the surface of the interactive cooking preparation device. The physical sensation is felt by the user when the user is touching the surface of the interactive cooking preparation device.

20 Claims, 16 Drawing Sheets

U.S. PATENT DOCUMENTS

| | | | |
|---|---|---|---|
| 4,807,169 A * | 2/1989 | Overbeck | 708/200 |
| 4,816,635 A * | 3/1989 | Edamura | 219/714 |
| 4,837,414 A * | 6/1989 | Edamula | 219/714 |
| 4,841,125 A * | 6/1989 | Edamura | 219/506 |
| 4,914,277 A * | 4/1990 | Guerin et al. | 219/506 |
| 4,919,950 A * | 4/1990 | Mak | 426/233 |
| 4,922,435 A * | 5/1990 | Cahlander et al. | 700/247 |
| 4,933,527 A * | 6/1990 | Edamura | 219/714 |
| 4,968,864 A * | 11/1990 | Doi et al. | 219/714 |
| 5,183,984 A * | 2/1993 | Nakagawa | 219/720 |
| 5,221,817 A * | 6/1993 | Ota | 219/720 |
| 5,317,134 A * | 5/1994 | Edamura | 219/720 |
| 5,321,229 A * | 6/1994 | Holling et al. | 219/445.1 |
| 5,321,232 A * | 6/1994 | Ogle | 219/506 |
| 5,352,874 A * | 10/1994 | Gong | 219/704 |
| 5,357,426 A * | 10/1994 | Morita et al. | 700/90 |
| 5,386,762 A * | 2/1995 | Gokey | 99/326 |
| 5,426,280 A * | 6/1995 | Smith | 219/506 |
| 5,436,510 A * | 7/1995 | Gilbert | 307/38 |
| 5,495,095 A * | 2/1996 | de Matteis et al. | 219/720 |
| 5,528,018 A * | 6/1996 | Burkett et al. | 219/506 |
| 5,619,906 A * | 4/1997 | Ishida | 99/344 |
| 5,708,255 A * | 1/1998 | Lamanna et al. | 219/396 |
| 5,756,970 A * | 5/1998 | Barger et al. | 219/506 |
| 5,780,821 A * | 7/1998 | Choi et al. | 219/703 |
| 5,812,393 A * | 9/1998 | Drucker | 700/15 |
| 5,829,341 A * | 11/1998 | Lin | 99/326 |
| 5,877,477 A * | 3/1999 | Petty et al. | 219/506 |
| 5,881,632 A * | 3/1999 | Fadoul | 99/326 |
| 5,883,801 A * | 3/1999 | Drucker et al. | 700/15 |
| 5,932,130 A * | 8/1999 | Taino | 219/702 |
| 5,960,440 A * | 9/1999 | Brenner et al. | 1/1 |
| 6,026,372 A * | 2/2000 | Savage | 705/15 |
| 6,060,701 A * | 5/2000 | McKee et al. | 219/681 |
| 6,064,050 A * | 5/2000 | Ishikawa et al. | 219/720 |
| 6,088,681 A * | 7/2000 | Coleman et al. | 705/15 |
| 6,137,095 A * | 10/2000 | Kashimoto et al. | 219/702 |
| 6,157,014 A * | 12/2000 | Goranson | 219/700 |
| 6,180,934 B1 * | 1/2001 | Ishizaki et al. | 219/720 |
| 6,198,975 B1 * | 3/2001 | Drucker et al. | 700/15 |
| 6,249,710 B1 * | 6/2001 | Drucker et al. | 700/15 |
| 6,262,406 B1 * | 7/2001 | McKee et al. | 219/681 |
| 6,334,684 B1 * | 1/2002 | Yoshida et al. | 353/28 |
| 6,344,636 B1 * | 2/2002 | Kim | 219/702 |
| 6,353,214 B2 * | 3/2002 | Choi | 219/702 |
| 6,370,513 B1 * | 4/2002 | Kolawa et al. | 705/7.33 |
| 6,381,614 B1 * | 4/2002 | Barnett et al. | 1/1 |
| 6,444,965 B1 * | 9/2002 | Ha et al. | 219/702 |
| 6,480,753 B1 * | 11/2002 | Calder et al. | 700/83 |
| 6,486,453 B1 * | 11/2002 | Bales et al. | 219/702 |
| 6,497,276 B2 * | 12/2002 | Clark et al. | 165/206 |
| 6,549,818 B1 * | 4/2003 | Ali | 700/90 |
| 6,550,681 B1 * | 4/2003 | Ross et al. | 235/462.13 |
| 6,552,309 B1 * | 4/2003 | Kish et al. | 219/506 |
| 6,557,756 B1 * | 5/2003 | Smith | 235/379 |
| 6,559,882 B1 * | 5/2003 | Kerchner | 348/61 |
| 6,578,469 B2 * | 6/2003 | Sharpe | 99/342 |
| 6,587,739 B1 * | 7/2003 | Abrams et al. | 700/83 |
| 6,624,803 B1 * | 9/2003 | Vanderheiden et al. | 345/156 |
| 6,632,013 B2 * | 10/2003 | Wulf et al. | 366/199 |
| 6,681,137 B1 * | 1/2004 | Drucker et al. | 700/15 |
| 6,759,637 B2 * | 7/2004 | Kim | 219/702 |
| 6,777,651 B1 * | 8/2004 | Boyer | 219/400 |
| 6,789,067 B1 * | 9/2004 | Liebenow | 705/15 |
| 6,809,301 B1 * | 10/2004 | McIntyre et al. | 219/506 |
| 6,867,399 B2 * | 3/2005 | Muegge et al. | 219/681 |
| 6,933,477 B2 * | 8/2005 | Becker et al. | 219/506 |
| 6,933,483 B2 * | 8/2005 | Chun | 219/720 |
| 6,934,592 B2 * | 8/2005 | Hood et al. | 700/83 |
| 6,936,801 B1 * | 8/2005 | Head | 219/702 |
| 6,975,910 B1 * | 12/2005 | Brown et al. | 700/90 |
| 7,076,324 B2 * | 7/2006 | Harkcom et al. | 700/211 |
| 7,117,051 B2 * | 10/2006 | Landry et al. | 700/83 |
| 7,151,968 B2 * | 12/2006 | Williamson | 700/65 |
| 7,156,207 B2 * | 1/2007 | Simon | 186/38 |
| 7,249,708 B2 * | 7/2007 | McConnell et al. | 235/383 |
| 7,268,698 B2 * | 9/2007 | Hart et al. | 340/870.07 |
| 7,383,985 B1 * | 6/2008 | Aisa | 235/376 |
| 7,564,370 B2 * | 7/2009 | Hart et al. | 340/870.07 |
| 7,605,349 B2 * | 10/2009 | Gaynor et al. | 219/442 |
| 7,641,380 B2 * | 1/2010 | Behar et al. | 366/205 |
| 7,675,504 B2 * | 3/2010 | Smith et al. | 345/156 |
| 7,813,822 B1 * | 10/2010 | Hoffberg | 700/94 |
| 7,820,947 B2 * | 10/2010 | Gaynor et al. | 219/442 |
| 2001/0009256 A1 * | 7/2001 | Nasu et al. | 219/739 |
| 2002/0157411 A1 * | 10/2002 | Ishikawa et al. | 62/231 |
| 2002/0171674 A1 * | 11/2002 | Paris | 345/700 |
| 2002/0174014 A1 * | 11/2002 | Wittrup | 705/15 |
| 2003/0070789 A1 * | 4/2003 | Mueller et al. | 165/61 |
| 2003/0070799 A1 * | 4/2003 | Mueller et al. | 165/254 |
| 2003/0094449 A1 * | 5/2003 | Keller et al. | 219/494 |
| 2003/0130908 A1 * | 7/2003 | Hing | 705/26 |
| 2003/0234246 A1 * | 12/2003 | Arnold | 219/445.1 |
| 2004/0004559 A1 * | 1/2004 | Rast | 341/34 |
| 2004/0060932 A1 * | 4/2004 | Chun | 219/714 |
| 2005/0011886 A1 * | 1/2005 | Kim | 219/702 |
| 2005/0103572 A1 * | 5/2005 | Simon | 186/38 |
| 2006/0259547 A1 * | 11/2006 | Bogatin et al. | 709/203 |
| 2007/0129812 A1 * | 6/2007 | Ferchau | 700/1 |
| 2007/0129813 A1 * | 6/2007 | Ferchau | 700/1 |
| 2008/0122585 A1 * | 5/2008 | Castaldo et al. | 340/286.01 |
| 2008/0128397 A1 * | 6/2008 | Gandhi | 219/121.69 |
| 2008/0136785 A1 * | 6/2008 | Baudisch et al. | 345/173 |
| 2008/0140862 A1 * | 6/2008 | Elston et al. | 709/248 |
| 2008/0143550 A1 * | 6/2008 | Ebrom et al. | 340/825.69 |
| 2008/0192059 A1 | 8/2008 | Kennedy | 345/537 |
| 2008/0222553 A1 * | 9/2008 | Benjamin-Lambert | 715/779 |
| 2008/0270230 A1 | 10/2008 | Hendrickson et al. | 705/14.27 |
| 2009/0002327 A1 | 1/2009 | Wilson et al. | 345/173 |
| 2009/0006970 A1 | 1/2009 | Jeffery et al. | 715/733 |
| 2009/0029326 A1 | 1/2009 | Kark et al. | 434/127 |
| 2009/0044137 A1 | 2/2009 | Bartley et al. | 715/764 |
| 2009/0090704 A1 * | 4/2009 | Halpin et al. | 219/209 |
| 2009/0091529 A1 | 4/2009 | Do et al. | 345/156 |
| 2009/0091539 A1 | 4/2009 | Do et al. | 345/173 |
| 2009/0091555 A1 | 4/2009 | Do et al. | 345/175 |
| 2009/0094515 A1 | 4/2009 | Do et al. | 715/273 |
| 2009/0094561 A1 | 4/2009 | Do et al. | 715/863 |
| 2009/0099850 A1 | 4/2009 | Do et al. | 704/276 |
| 2009/0206070 A1 * | 8/2009 | Ortner et al. | 219/398 |
| 2010/0182136 A1 * | 7/2010 | Pryor | 340/425.5 |

* cited by examiner

INTERACTIVE RECIPE PREPARATION USING INSTRUCTIVE DEVICE WITH INTEGRATED ACTUATORS TO PROVIDE TACTILE FEEDBACK

BACKGROUND OF THE INVENTION

1. Technical Field

The present invention relates to an approach for interactive recipe preparation using a computerized instructive device that includes integrated actuators to provide the user with tactile feedback.

2. Description of the Related Art

Various sources are available to assist a user in preparing meals and following a recipe. These sources include books, television programs, videos, and Internet sources. These sources provide cooking guidance and teaching assisting users with a variety of skill levels. These sources often provide step-by-step instructions.

A challenge of these sources is that they are not interactive. One approach to this challenge is a live cooking instructor with whom the user can interact. However, cooking instruction is quite costly, especially personal instruction, and is generally provided at a location outside the user's home, such as at a cooking school or restaurant. Implements and ingredients found at cooking schools and restaurants is often quite different from the implements and ingredients found at the user's home. These differences make it challenging to apply the instruction provided at the cooking school or restaurant with recipe preparation at the user's normal location, such as the user's home kitchen.

Another challenge is that traditional sources do not provide additional computerized intelligence to assist the user during meal preparation. In addition, traditional sources do not interface with the user's appliances in order to further assist the user. Finally, traditional sources do not monitor the user's performance nor do they alert the user when the user is not following the recipe correctly.

SUMMARY

It has been discovered that the aforementioned challenges are resolved by using a interactive cooking preparation device that includes a flexible horizontal display surface and a set of actuators located under the flexible horizontal display surface that, when activated, cause a tactile sensation on the display surface. A user of the interactive cooking preparation device selects a recipe from a list of recipes. A set of preparation steps that correspond to the selected recipe are retrieved from a data store. Each of the retrieved preparation steps are displayed to the user on the flexible horizontal surface display. A current preparation step that is being performed by the user is identified. The user is directed to an area of the interactive cooking preparation device using a tactile feedback mechanism. The tactile feedback mechanism causes a physical sensation on the surface of the interactive cooking preparation device. The physical sensation is felt by the user when the user is touching the surface of the interactive cooking preparation device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
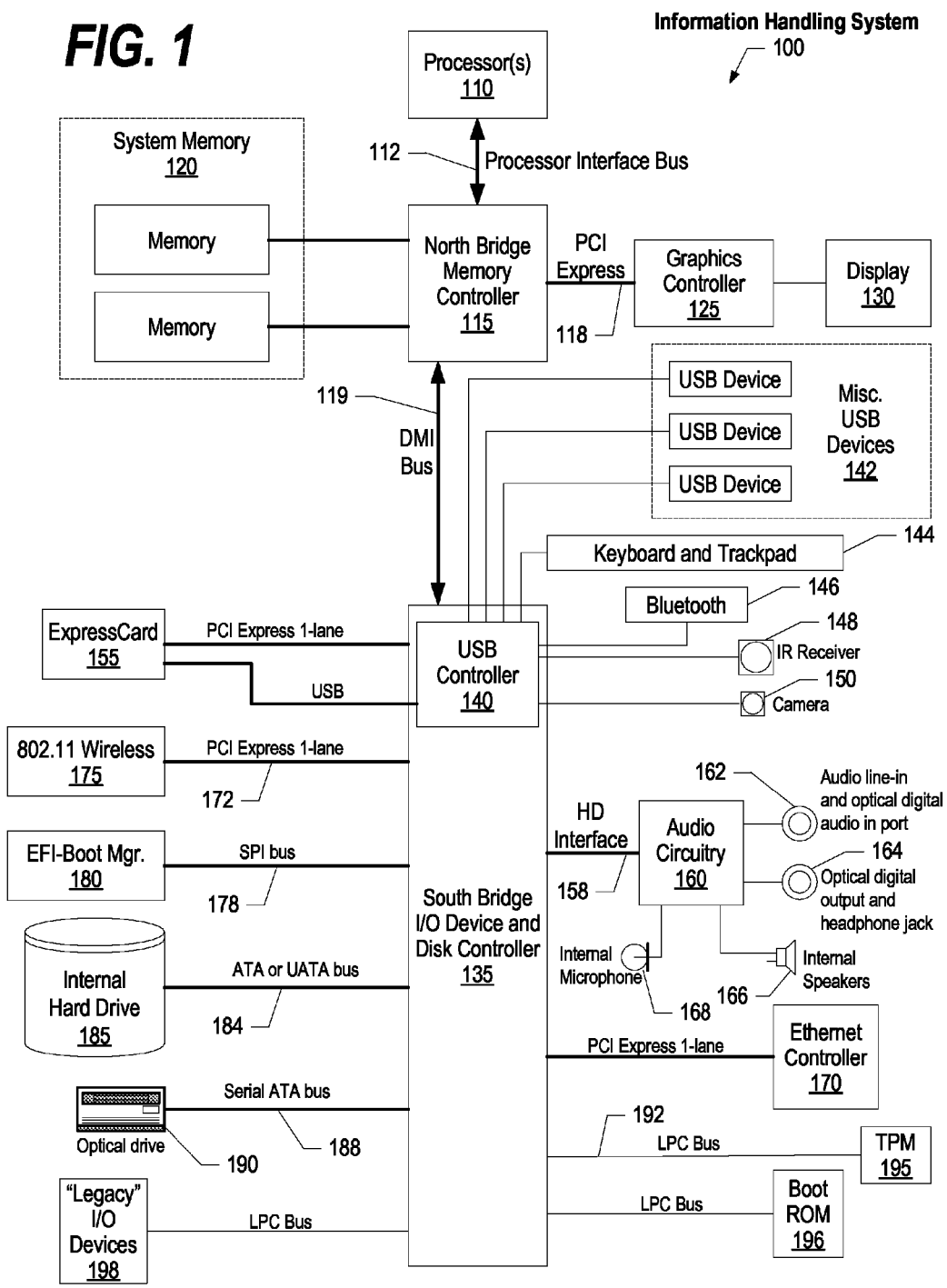
FIG. 1 is a block diagram of a data processing system in which the methods described herein can be implemented.
Figure 2:
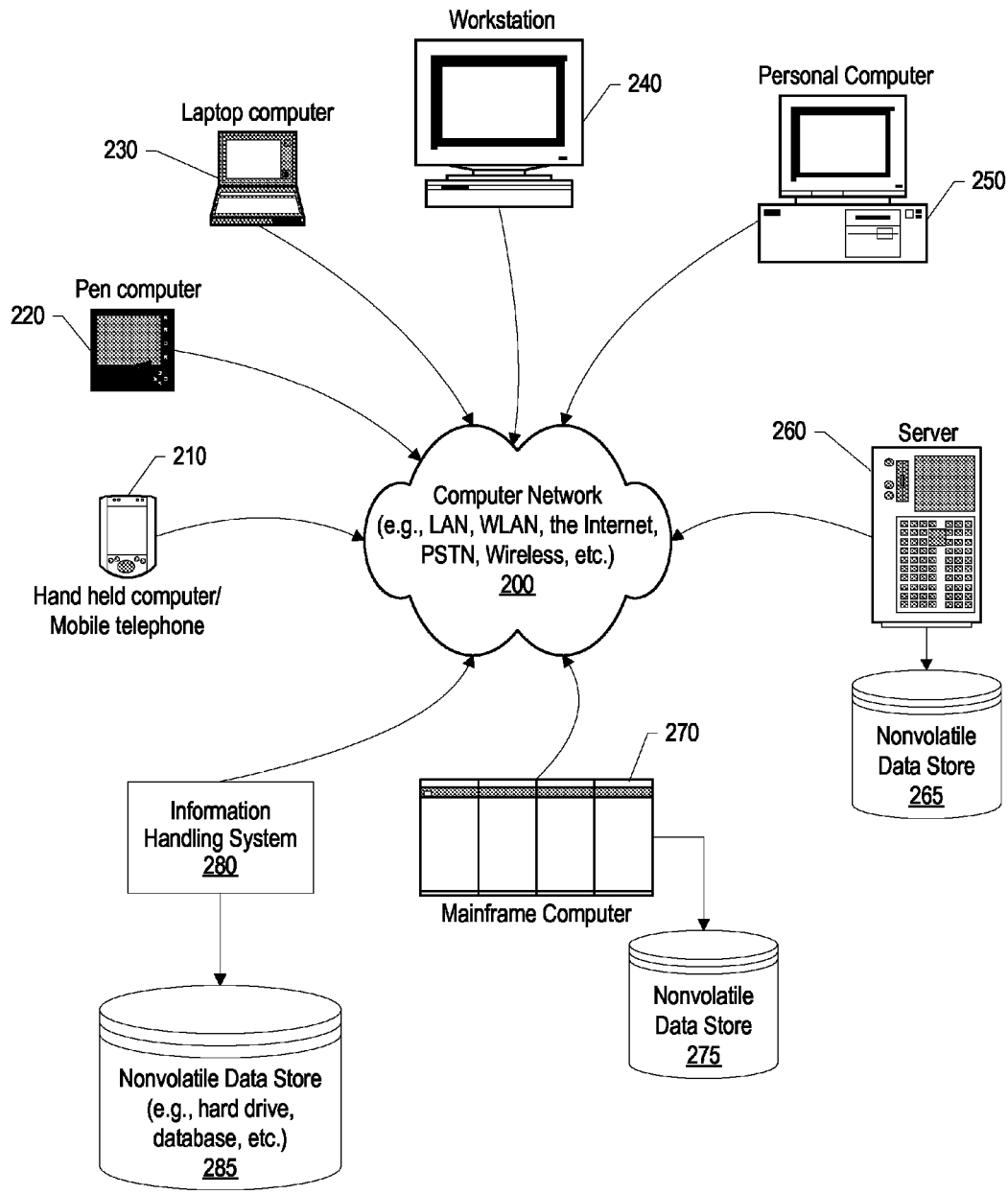
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which are coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 300 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc. Removable storage device 145 can also be a hybrid disk drive, such as hybrid disk drive 300 shown in FIGS. 3-6.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
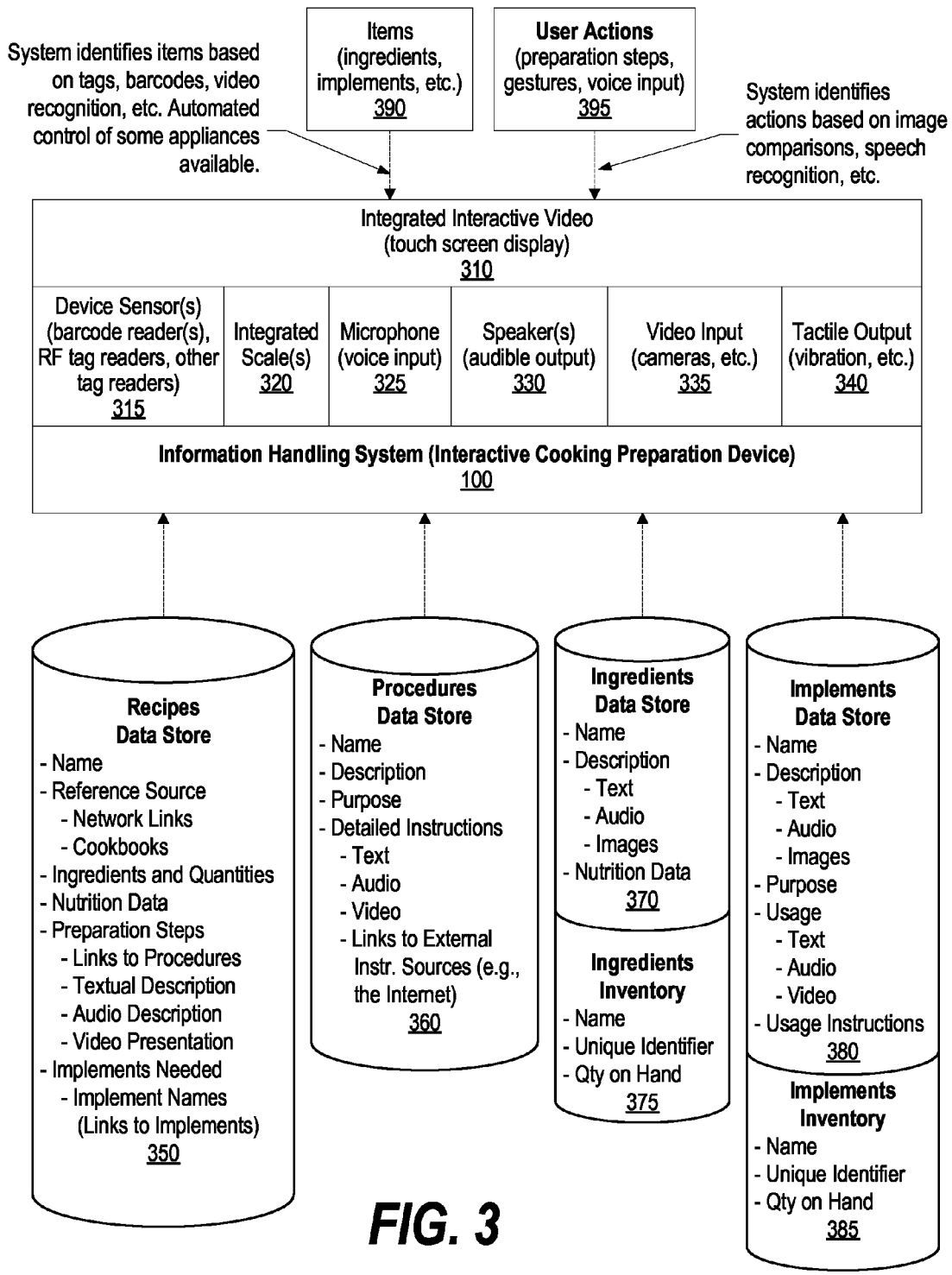
FIG. 3 is a diagram of the components used in an interactive cooking preparation device that is an extension of the information handling system shown in FIG. 1.

FIG. 3 is a diagram of the components used in an interactive cooking preparation device that is an extension of the information handling system shown in FIG. 1. Information handling system 100, which is an interactive cooking preparation device, includes integrated interactive video display 310 which is a touch screen display. In one embodiment, display 310 is mounted horizontally so that items 390 can be placed upon the display. In a further embodiment, the horizontal display is a flexible surface (such as a Flexible Organic Light-Emitting Diode (Flexible OLED or FOLED) display panel). Device sensors 315 are included in the interactive cooking preparation device. In one embodiment, device sensors 315 are barcode sensors, in another embodiment the sensors are RF tag or other tag readers, and in another embodiment the sensors are a combination of barcode and tag reading sensors. Sensors 315 are used to sense various items 390 placed on horizontal surface 310. These items may include various implements (e.g., knives, spoons, etc.), ingredients used to prepare recipes, kitchen appliances (e.g., mixers, etc.) and any other item used to prepare recipes. Items are affixed with an identifier, such as a barcode or a tag, that can be sensed by sensors 315 when the item is placed in proximity to one or more of the sensors. One or more integrated scales 320 are also included in the interactive cooking preparation device. Integrated scales 320 are used to weigh items 390 placed on the surface of the interactive cooking preparation device. In one embodiment, the interactive cooking preparation device includes microphone 325 to allow the user to communicate with the interactive cooking preparation device using voice responses and commands. As noted, one of user actions 395 include voice input that is received by microphone 325. One or more speakers 330 are included in the interactive cooking preparation device in order to provide the user with audible output, such as audible output used in recipe preparation. In addition, audible output from speakers 330 can be combined with multimedia content where a video is displayed on horizontal display screen 310 coupled with audio that is played through speakers 330.

Video input devices 335 are also included in the interactive cooking preparation device. Video input devices 335 can capture images of items 390 that are in proximity of the interactive cooking preparation device. In this manner, video input devices 335 can be used as additional sensor devices, especially when an item does not have an identifier and is, instead, identified based on the items shape or appearance using one or more video input devices. In addition, video input devices 335 capture user actions 395, such as the user performing a preparation step, making various gestures, and the like. Tactile output mechanism 340 is a mechanism used to provide tactile feedback to the user. In one embodiment, actuators are located under flexible video display panel 310 and, when actuated, provide a sensation on the horizontal surface of the interactive cooking preparation device that can be felt by the user.

Various data stores (e.g., databases, flat files, etc.) are stored in nonvolatile storage devices accessible from the interactive cooking preparation device 100. As shown, these data stores include recipes data store 350, procedures data store 360, ingredients data store 370, ingredients inventory data store 375, implements data store 380, and implements inventory data store 385. Recipes data store 350 includes a variety recipes with information related to each recipe. Recipes data store 350 includes the following information regarding recipes:

Name of the recipe;
Reference Source where recipe is found (e.g., name of author, chef, book, etc.);
Network Links (e.g., Internet web site where more info available);
Cookbooks where recipe is included;
Ingredients and Quantities (including links to ingredient entries in ingredients data store 370);
Nutrition Data (calories, fat, carbohydrates, etc.);
Preparation Steps (e.g., chopping, stirring, etc.);
Links to Procedures (links to procedure entries in procedures data store 360);
Textual Description of the recipe;
Audio Description of the recipe;
Video Presentation showing recipe and how prepared;
Implements Needed to prepare recipe; and
Implement Names (including links to implement entries in implements data store 380).

Procedures data store 360 includes a number of procedures (e.g., chop, stir, sauté, etc.) used to create various recipes). Procedures data store 360 includes the following information regarding procedures:

Name of the procedure;
Description—textual description;
Purpose—reason(s) why this procedure is used; and
Detailed Instructions that may include any or all of:
    Text—detailed textual instructions;
    Audio—detailed audio instructions;
    Video—detailed video instructions; and
    Links to External Instruction Sources (e.g., links to instruction sources available on the Internet, etc.)

Ingredients data store 370 includes a number of ingredients used to create various recipes. Ingredients data store 370 includes the following information regarding ingredients:

Name—a unique name (identifier) assigned to the ingredient

Description of the ingredient that may include any or all of:

Text—detailed textual description, including the expiration date of the ingredient (if applicable), ideal weight of ingredient (such as a piece of fruit, etc.) ideal texture or appearance of ingredient;

Audio—detailed audio description; and

Images—images (photos) of what the ingredient looks like; and

Nutrition Data—(calories, fat, carbohydrates, etc.).

Ingredients Inventory data store 375 includes a list and quantity of ingredients on hand in the user's location (e.g., kitchen, pantry, etc.). Ingredients Inventory data store 375 includes the name of the ingredient, a unique identifier used to match the ingredient on hand to its counterpart in ingredients data store 370, a quantity on hand (how much of the ingredient is on hand), as well as other metadata about the ingredient, such as when the ingredient was last purchased.

Implements data store 380 includes a number of implements used to create various recipes. Implements data store 380 includes the following information regarding implements:

Name—a unique name (identifier) assigned to the implement;

Description of the implement that may include any or all of:

Text—detailed textual description;

Audio—detailed audio description; and

Images—images (photos) of what the implement looks like;

Purpose—text, audio, multimedia descriptions of the purpose, or reasons, for using the implement;

Usage of the implement that may include any or all of:

Text—detailed textual usage description;

Audio—detailed audio usage description;

Video—detailed video usage description; and

Usage Instructions—text, audio, multimedia instructions regarding how the implement is properly used.

Implements Inventory data store 385 includes a list and quantity of implements on hand in the user's location (e.g., kitchen, pantry, etc.). Implements Inventory data store 385 includes the name of the implement, a unique identifier used to match the implement on hand to its counterpart in implements data store 380, a quantity on hand (how much of the implement is on hand), as well as other metadata about the implement, such as when the implement was last purchased and where the implement is located in the user's location (e.g., which cupboard, drawer, etc.).

Figure 4:
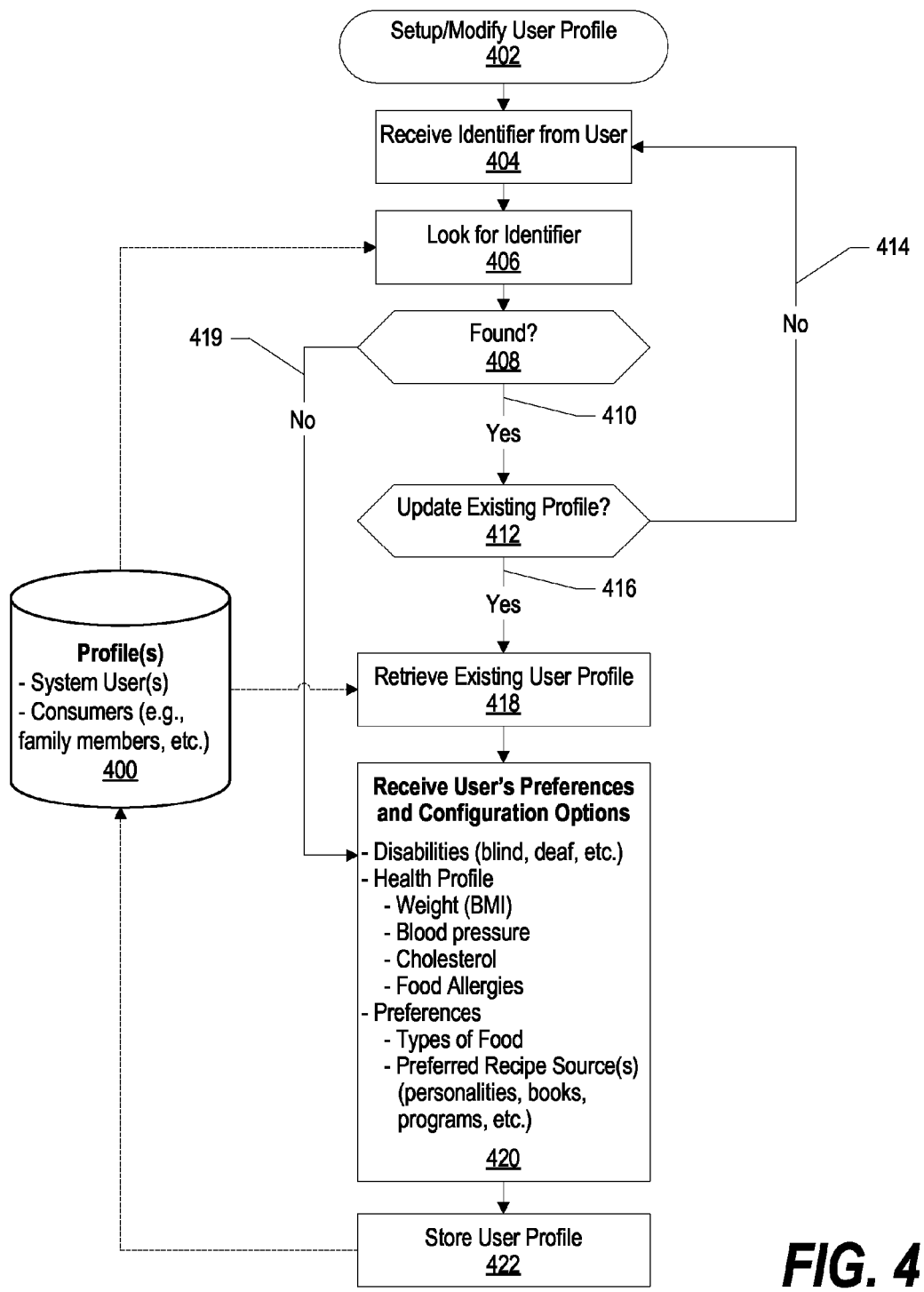
FIG. 4 is a flowchart showing steps taken to setup and modify a user profile used in the interactive cooking preparation device.

FIG. 4 is a flowchart showing steps taken to setup and modify a user profile used in the interactive cooking preparation device. User profiles are stored in profiles data store 400. Processing commences at 402 whereupon, at step 404, an identifier is received from the user. The identifier is unique to a person whose data is stored in profiles data store 400. The identifier could be a name, if the names are unique, or a unique code or number assigned to an individual. At step 406, the identifier received from the user is looked for in profiles data store 400. A determination is made as to whether the identifier received from the user was found in profiles data store 400 (decision 408). If the user identifier was found in profiles data store 400 then decision 408 branches to "yes" branch 410 whereupon a determination is made as to whether the user wishes to update the existing profile for the user as stored in profiles data store 400 (decision 412). If the user does not wish to update the profile, then decision 412 branches to "no" branch 414 which branches back to receive the next user identifier from the user (or exit if the user wishes to exit the processing shown). On the other hand, if the user wishes to update the existing user profile, then decision 412 branches to "yes" branch 416, whereupon, at step 418, the existing user profile that corresponds with the received user identifier is retrieved from profiles data store 400. Returning to decision 408, if the identifier received from the user is not found in profiles data store 400, then the identifier is a new identifier and decision 408 branches to "no" branch 419 bypassing steps 412 to 418.

At step 420, the user edits and enters preferences and configuration options corresponding to the user identifier that was received at step 404. The preferences and configuration options entered at step 420 include:

Disabilities—whether the user corresponding to the identifier has a disability (e.g., blind, deaf, etc.);

Health Profile of the user corresponding to the identifier. Health profile information includes data such as:

the person's weight (e.g., Body Mass Index (BMI), etc.);

the person's Blood pressure;

the person's Cholesterol; and other health factors.

Food Allergies—any food borne allergies that the person may have;

Preferences of the person including:

Types of Food the person enjoys (e.g., Italian, vegetarian, spicy, etc.);

Recipe Source(s) the person prefers (e.g., television personalities, cook books, programs, websites, etc.).

At step 422, the preference data entered and/or edited by the user in step 420 is saved in profiles data store 400 and associated with the identifier that was entered at step 404. The user can enter additional user identifiers and enter/edit profile data regarding other individuals until the user wishes to stop editing profile information, at which point processing used to setup and modify user profiles ends.

Figure 5:
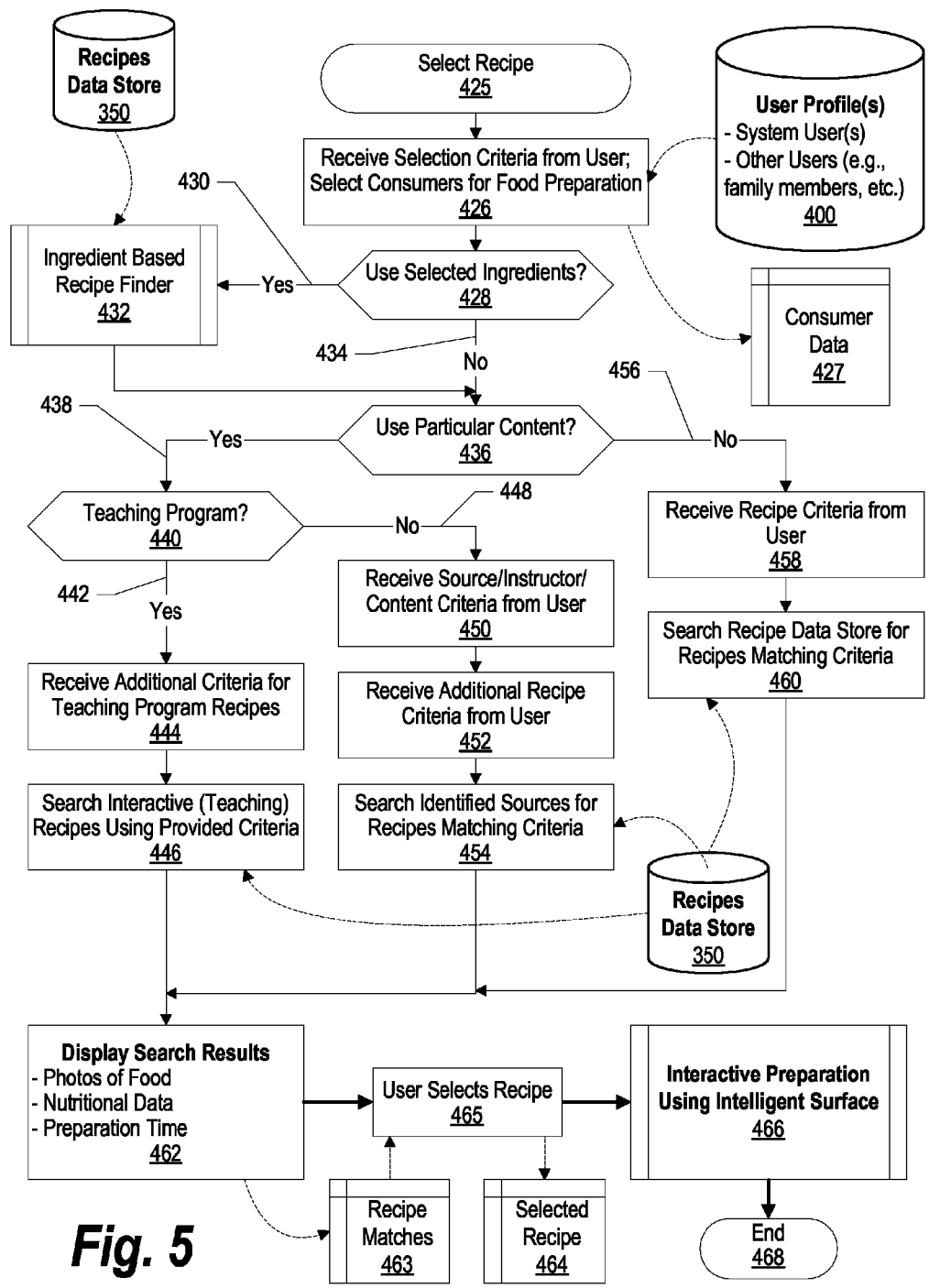
FIG. 5 is a flowchart showing steps taken to select a recipe using the interactive cooking preparation device.

FIG. 5 is a flowchart showing steps taken to select a recipe using the interactive cooking preparation device. Processing commences at 425 whereupon, at step 426, a selection is received from the user of the interactive cooking preparation device. The selection includes the particular user that is using the interactive cooking preparation device, such as by the user providing the interactive cooking preparation device with the user's unique identifier, that is then retrieved from user profiles data store 400 to retrieve characteristics of the user as previously described as being included in data store 400. In addition, the user identifies consumers that are the individuals for whom the user is preparing a recipe. Data regarding the consumers (e.g., customers, family members, diners, patrons, etc.) is retrieved, if available, from profile data store 400. Among other factors, the retrieved data will inform the user if any of the consumers have particular food borne allergies or other food preferences or dislikes that should be taken into account when preparing a recipe. The user can select multiple consumers and the selected consumer data is stored in current consumer memory area 427.

A determination is made as to whether the user wishes to match selected ingredients with available recipes (decision 428). If the user wishes to match selected ingredients with available recipes, then decision 428 branches to "yes" branch 430 whereupon, at step 432, an ingredients based recipe finder routine is performed that retrieves recipes from recipes data store 350 based upon ingredients selected by the user. On the other hand, if the user does not want to use selected ingredients in a recipe, then decision 428 branches to "no" branch 434 bypassing step 432.

A determination is made as to whether the user wishes to use any particular recipe content, such as a favorite cookbook or chef, in selecting a recipe (decision 436). If the user wishes to use particular content in selecting a recipe, then decision 436 branches to "yes" branch 438 whereupon a determination is made as to whether the user wishes to use an teaching program to prepare a recipe (decision 440). If the user wishes to use an interactive teaching program, then decision 440 branches to "yes" branch 442 whereupon, at step 444, additional criteria is received from the user about teaching programs in which the user is interested, such as a favorite instructor, delivery format, or the like. At step 446, recipes data store 350 is searched for recipes that have interactive teaching that match the user's preferences.

Returning to decision 440, if the user wishes to use recipes from certain providers but does not wish to limit recipes to those with interactive instructional content, then decision 440 branches to "no" branch 448 whereupon, at step 450, the user provides additional search parameters regarding the source of the recipe, such as favorite chefs, cookbooks, etc. At step 452, the user provides additional recipe criteria, such as consumer preferences, food borne allergies, and the like, that were retrieved at step 426 for the consumers of the meal. At step 454, recipes data store 350 is searched for recipes matching the user's search criteria both in terms of sources as well as consumer preferences.

Returning to decision 436, if the user does not wish to limit recipes to any particular providers, then decision 436 branches to "no" branch 456 whereupon, at step 458, the user provides recipe criteria, such as consumer preferences, food borne allergies, and the like, that were retrieved at step 426 for the consumers of the meal. At step 460, recipes data store 360 is searched for recipes matching the user's search preferences entered at step 458.

After the user has entered whatever search criteria is desired, at step 462, the results of searching recipes data store 350 are displayed to the user. The search results displayed can include photographs of the recipes, nutritional data corresponding to the recipes, preparation time and ingredients needed to prepare the recipes, and any other recipe-related data that is included in recipes data store 350. In addition, reviews of the recipes, as provided by professionals and/or other cooks, can also be provided to help the user make a recipe selection. The recipes that match the user's search criteria are stored in recipe matches memory area 463. At step 465, the user selects one of the recipes displayed at step 465 and the selected recipe is stored in selected recipe memory area 464. At step 466, the interactive cooking preparation device is used to assist the user in preparing selected recipe 464. Processing thereafter ends at 468.

Figure 6:
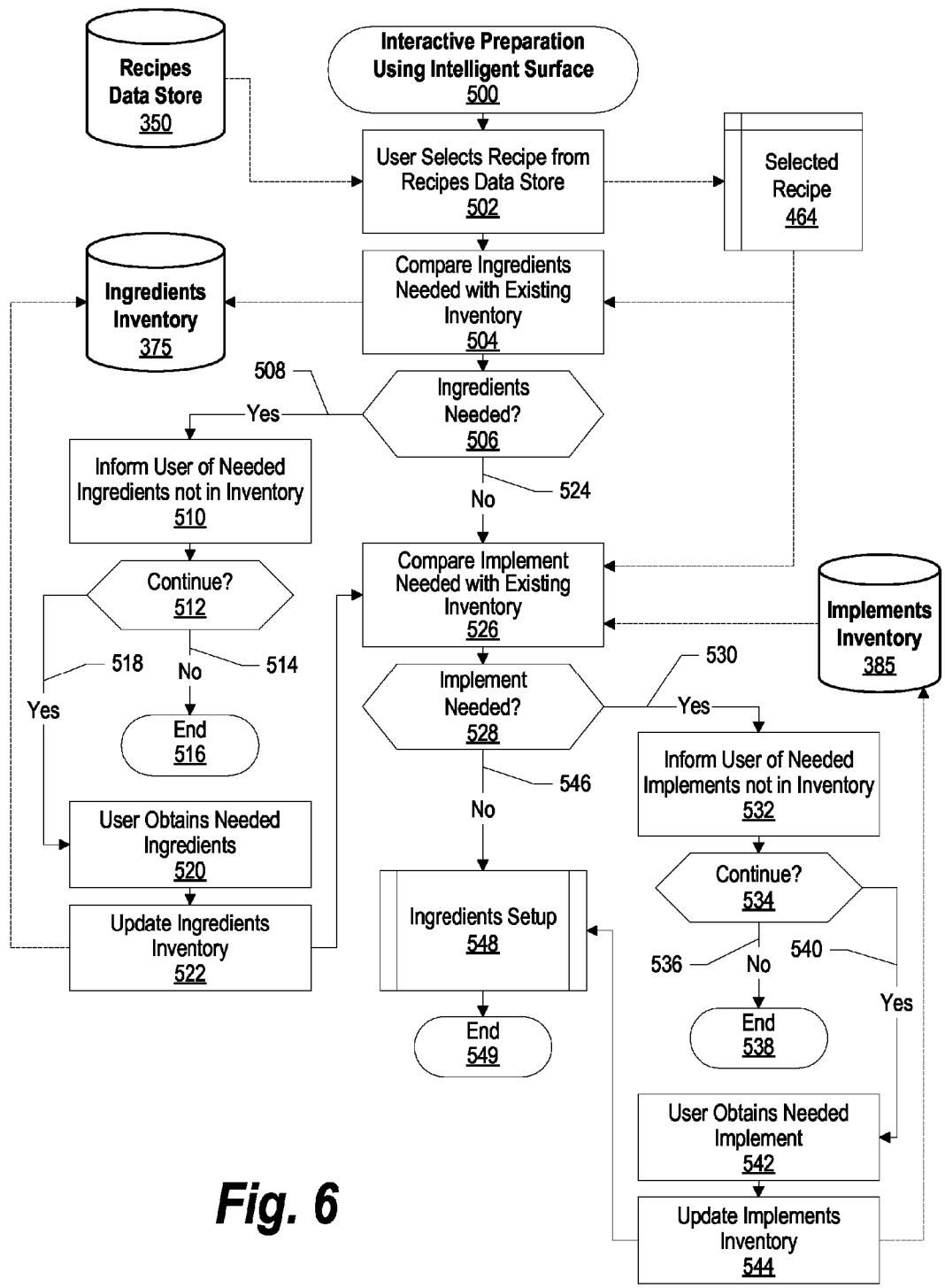
FIG. 6 is a flowchart showing steps taken to interactively prepare a recipe using the interactive cooking preparation device.

FIG. 6 is a flowchart showing steps taken to interactively prepare a recipe using the interactive cooking preparation device. Processing commences at 500 whereupon, at step 502, the user selects a recipe from recipes data store 350 using one of various means described herein. The selected recipe is stored in selected recipe memory area 464. At step 504, the ingredients needed to prepare the selected recipe are compared with the ingredients currently on-hand as set forth in ingredients inventory data store 375. A determination is made (decision 506), base on the comparison, as to whether additional ingredients are needed that are not at the user's location (kitchen, pantry, etc.). If additional ingredients are needed in order to prepare the recipe, then decision 506 branches to "yes" branch 508 whereupon, at step 510, the user is informed that in order to prepare the selected recipe additional ingredients are needed. A determination is made by the user as to whether to continue preparing the recipe (decision 512). If the user does not wish to continue (e.g., the user is unable to obtain the needed ingredients and would rather prepare a different recipe, etc.), then decision 512 branches to "no" branch 514 and processing ends at 516. On the other hand, if the user wishes to continue preparing the selected recipe, then decision 512 branches to "yes" branch 518 whereupon, at step 520, the user obtains the needed ingredients and, at step 522, ingredients inventory data store 375 is updated according to the quantity of the ingredient(s) obtained.

When the user has the needed ingredients decision 506 branches to "no" branch 524 whereupon, at step 526, the implements needed to prepare the selected recipe are compared with the implements currently on hand (implements inventory data store 385) at the user's location (kitchen, etc.). A determination is made, based on the comparison, as to whether additional implements are needed in order to prepare the selected recipe (decision 528). For example, if the selected recipe is for "creme brulee" and the user does not have a pastry torch, then the user would be instructed to obtain a torch in order to make the selected recipe. If one or more additional implements are needed, then decision 528 branches to "yes" branch 530 whereupon, at step 532, the user is informed of the needed implements that are not in the user's inventory. A determination is made by the user as to whether to continue preparing the selected recipe (decision 534). If the user chooses not to continue (e.g., the user cannot obtain the needed implement, etc.), then decision 534 branches to "no" branch 536 whereupon processing ends at 538. On the other hand, if the user chooses to continue (e.g., borrowing the implement from someone, buying the implement, improvising and using a different implement, etc.), then decision 534 branches to "yes" branch 540 whereupon, at step 542 the user obtains the needed implement (or an different implement with which the user will improvise). At step 544, if the user purchased the needed implement, then implements inventory data store 385 is updated.

When the user has the needed ingredients and implements (decision 528 branching to "no" branch 546 or the user obtaining the needed implements), then, at step 548, an ingredients setup routine is executed to setup the ingredients for use with the interactive cooking preparation device. Processing thereafter ends at 549.

Figure 7:
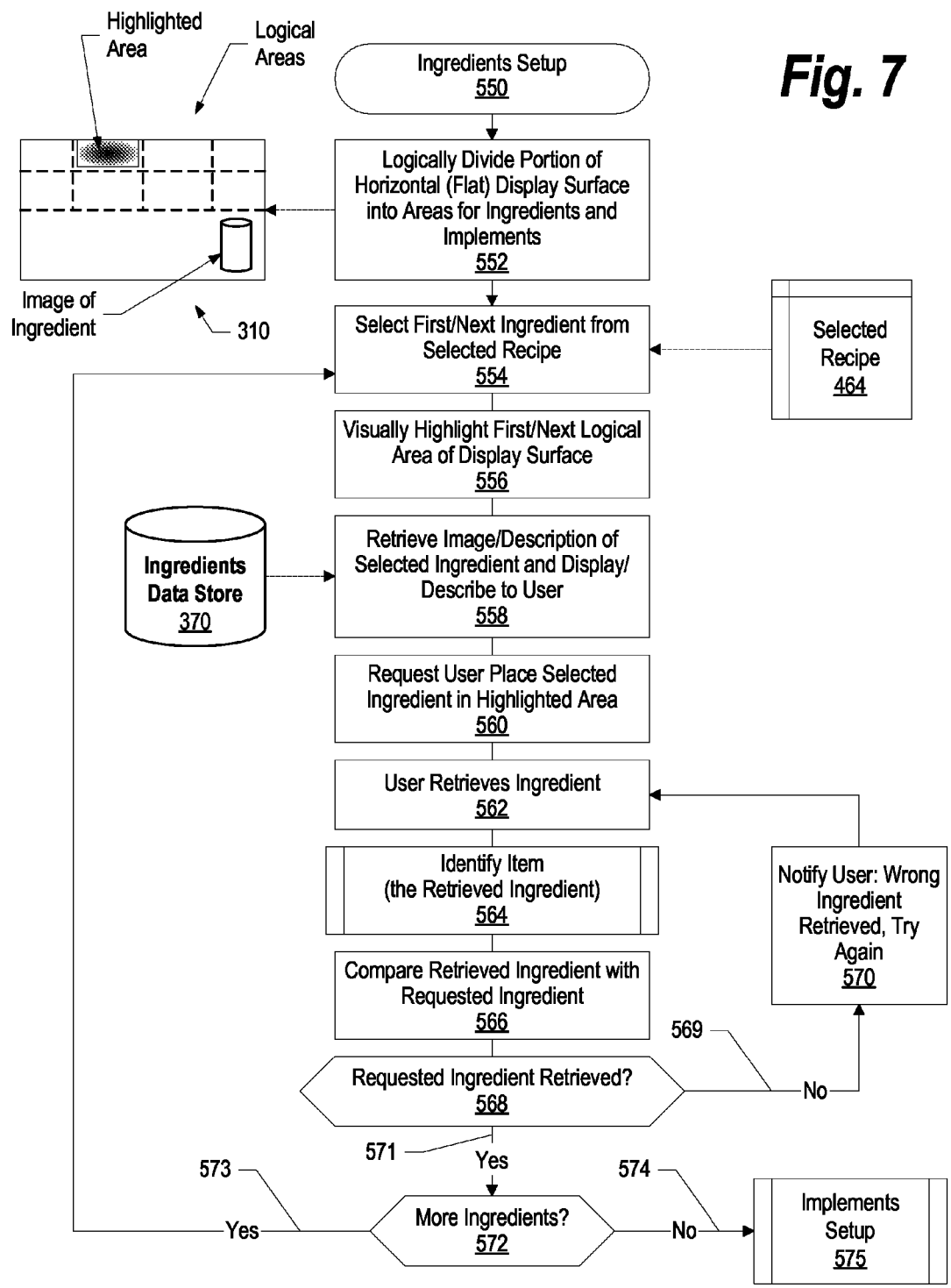
FIG. 7 is a flowchart showing steps taken to setup ingredients used during recipe preparation using the interactive cooking preparation device.

FIG. 7 is a flowchart showing steps taken to setup ingredients used during recipe preparation using the interactive cooking preparation device. Processing commences at 550 whereupon, based upon the ingredients and implements needed to prepare the selected recipe, at step 552, a surface of interactive cooking preparation device 310 is logically divided into a number of areas where ingredients and implements will be placed. At step 554 the first ingredient needed for selected recipe 464 is selected. At step 556, a first area of the surface of interactive cooking preparation device 310 is highlighted. In one embodiment, the surface is a horizontal display screen. In this embodiment, the area is highlighted visually by displaying a highlight icon, such as an image of the selected ingredient in the area where the ingredient is to be placed. At step 558, an image or other description of the selected ingredient is retrieved from ingredients data store 370. At step 560, the user is requested to place the selected ingredient on the highlighted surface area. In one embodiment, the instructions and requests to the user are presented to the user according to the user's communication preference (e.g., visually, audibly, etc.) based on the particular needs and preferences of the user. At step 562, the user retrieves the selected ingredient (e.g., from a pantry, cupboard, etc.) and places the ingredient on the surface of the interactive cooking preparation device in the highlighted area. At step 564, the interactive cooking preparation device uses sensors to identify the item (the ingredient) that the user placed in the highlighted area. At step 566, the interactive cooking preparation device compares the ingredient that was retrieved by the user with the requested ingredient. A determination is made as to whether the user retrieved the correct ingredient (decision 568). If the user did not retrieve the requested ingredient, then decision 568 branches to "no" branch 569 whereupon, at step 570, the user is notified that the wrong ingredient was retrieved and processing loops back to have the user retrieve the requested ingredient and place the requested ingredient on the highlighted area of the interactive cooking preparation device's surface. For example, if the recipe needs "baking soda" but the user retrieved "baking powder", then the user would be notified that the wrong ingredient was retrieved and, possibly prevent the user from using the wrong ingredient in the recipe. On the other hand, if the correct ingredient was retrieved by the user and placed in the highlighted surface area of the interactive cooking preparation device, then decision 568 branches to "yes" branch 571 whereupon a determination is made as to whether there are more ingredients needed for the recipe (decision 572). If more ingredients are needed, then decision 572 branches to "yes" branch 573 which loops back to select the next ingredient from the recipe and highlight another surface area of the interactive cooking preparation device where the next ingredient should be placed by the user. This looping continues until all the ingredients have been retrieved and placed on areas of the horizontal surface, at which time decision 572 branches to "no" branch 574 whereupon, at step 575, the user sets up the implements by placing them in requested areas.

Figure 8:
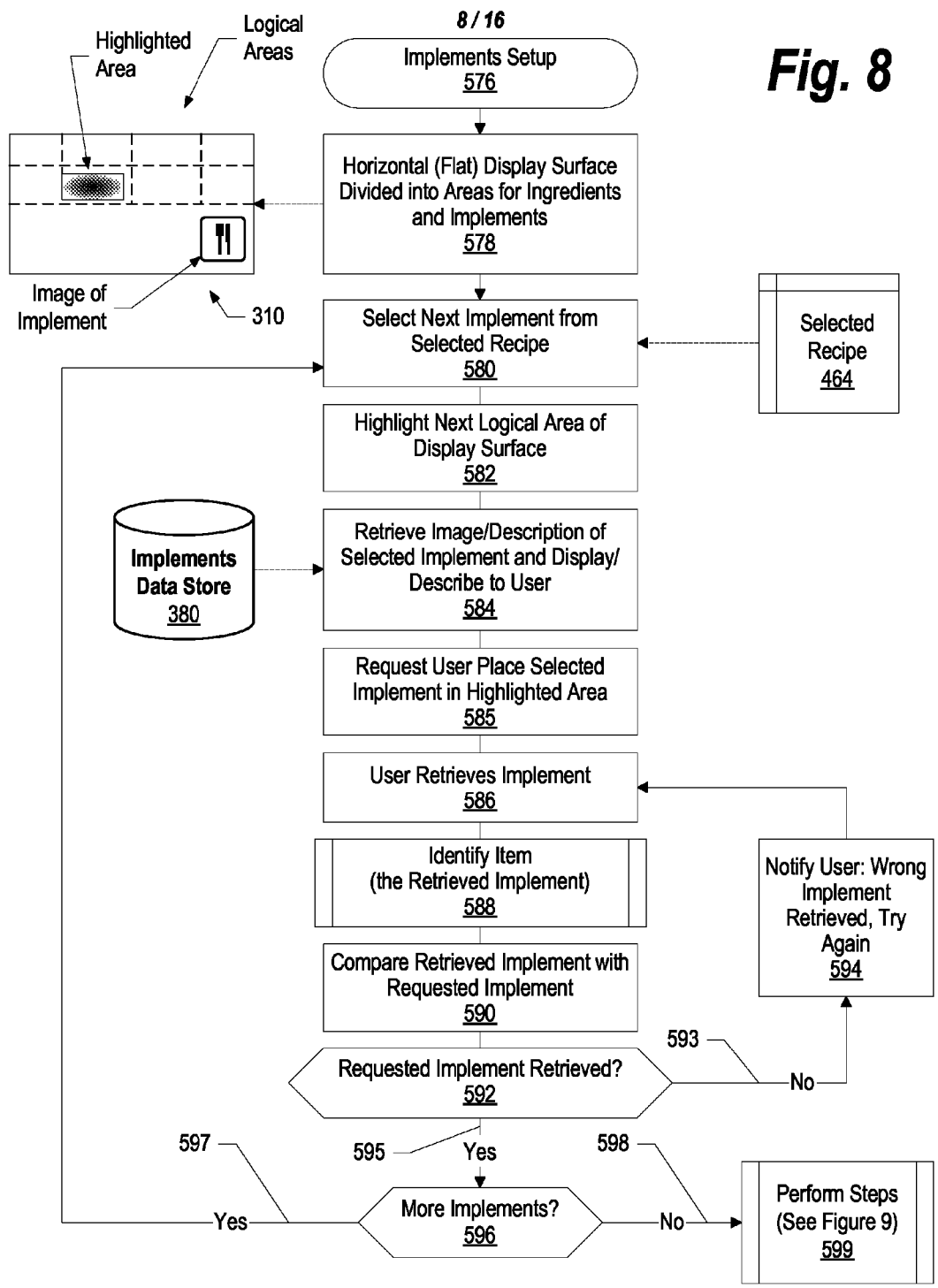
FIG. 8 is a flowchart showing steps taken to setup implements used during recipe preparation using the interactive cooking preparation device.

FIG. 8 is a flowchart showing steps taken to setup implements used during recipe preparation using the interactive cooking preparation device. Processing commences at 576 whereupon, at step 578, the surface area of interactive cooking preparation device 310 is divided into areas (if not already divided) for implement and implement placement. At step 580 the first implement needed for selected recipe 464 is selected. At step 556, a first area of the surface of interactive cooking preparation device 310 is highlighted. In one embodiment, the surface is a horizontal display screen. In this embodiment, the area is highlighted visually by displaying a highlight icon, such as an image of the selected implement in the area where the implement is to be placed. If ingredients have already been placed on the surface, then the first area used to store the first selected implement is the next area of the surface. At step 584, an image or other description of the selected implement is retrieved from implements data store 380. At step 585, the user is requested to place the selected implement on the highlighted surface area. In one embodiment, the instructions and requests to the user are presented to the user according to the user's communication preference (e.g., visually, audibly, etc.) based on the particular needs and preferences of the user. At step 586, the user retrieves the selected implement (e.g., from a drawer, cupboard, etc.) and places the implement on the surface of the interactive cooking preparation device in the highlighted area. At step 588, the interactive cooking preparation device uses sensors to identify the item (the implement) that the user placed in the highlighted area. At step 590, the interactive cooking preparation device compares the implement that was retrieved by the user with the requested implement. A determination is made as to whether the user retrieved the correct implement (decision 592). If the user did not retrieve the requested implement, then decision 592 branches to "no" branch 593 whereupon, at step 594, the user is notified that the wrong implement was retrieved and processing loops back to have the user retrieve the requested implement and place the requested implement on the highlighted area of the interactive cooking preparation device's surface. For example, if the recipe needs a colander but the user retrieved a bowl instead, then the user would be notified that the wrong implement was retrieved and, possibly prevent the user from using the wrong implement in the recipe. On the other hand, if the correct implement was retrieved by the user and placed in the highlighted surface area of the interactive cooking preparation device, then decision 592 branches to "yes" branch 595 whereupon a determination is made as to whether there are more implements needed for the recipe (decision 596). If more implements are needed, then decision 596 branches to "yes" branch 597 which loops back to select the next implement from the recipe and highlight another surface area of the interactive cooking preparation device where the next implement should be placed by the user. This looping continues until all of the implements have been retrieved and placed on areas of the horizontal surface, at which time decision 596 branches to "no" branch 598 whereupon, at step 599, the user performs the preparation steps set forth in the recipe.

Figure 9:
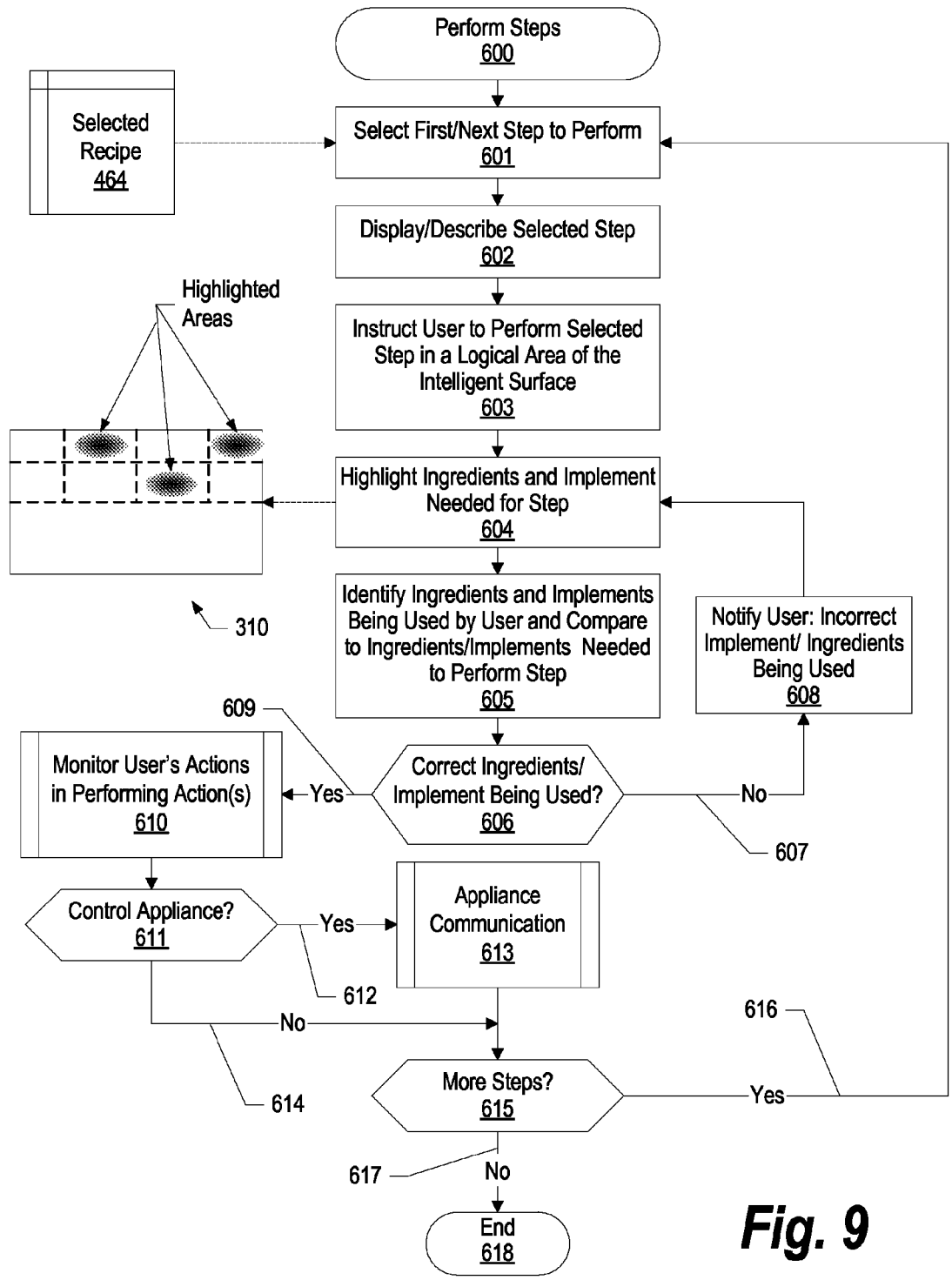
FIG. 9 is a flowchart of the processing performed to perform the steps set forth in a recipe.

FIG. 9 is a flowchart of the processing performed to perform the steps set forth in a recipe. Processing commences at 600 whereupon, at step 601, the first preparation step is selected from selected recipe 464 (e.g., combine various ingredients in a mixing bowl, etc.). At step 602, the selected step is presented to the user according to the user's preferences (e.g., visually, using multimedia demonstration clip, audibly, etc.). At step 603, the user is instructed to perform the selected preparation step on the surface (e.g., a work area) of interactive cooking preparation device 310. At step 604, the interactive cooking preparation device highlights (e.g., visually by generating a visual highlight at the horizontal display screen) in an area proximate to the ingredients and implements needed to perform the current preparation step. At step 605, the interactive cooking preparation device identifies the ingredients and implements being used by the user, using sensors included in the interactive cooking preparation device and compares the ingredients/implements being used to those requested in the preparation step. A determination is made as to whether the user is using the correct ingredients and implements (decision 606). If the user is not using the correct ingredients and implements, then decision 606 branches to "no" branch 607 whereupon, at step 608, the user is notified (alerted) of the problem and instructed to use the correct ingredients and implements to perform the preparation step of the selected recipe and processing loops back to highlight the areas on the surface where the ingredients and implements are located and re-identify the ingredients and implements being used by the user. When the user is using the correct ingredients and implements to perform the current preparation step of the selected recipe, then decision 606 branches to "yes" branch 609 whereupon, at step 610, the user's actions are monitored by the sensors to make sure that the user's actions fall within acceptable performance thresholds. A determination is made as to whether the current preparation step of the selected recipe involves control of an automated kitchen appliance (decision 611). If the current preparation step involves controlling a kitchen appliance, then decision 611 branches to "yes" branch 612 whereupon, at step 613, the appliance is controlled (e.g., turning on the oven to "bake" and setting the baking temperature to 350° F. On the other hand, if appliance control is not needed in the current preparation step, then decision 611 branches to "no" branch 614 bypassing step 613. A determination is made as to whether there are more preparation steps needed to perform to complete the selected recipe (decision 615). If there are more preparation steps needed to complete after the user has completed the current preparation step, then decision 615 branches to "yes" branch 616 which loops back to select the next preparation step from selected recipe 464 and process the next step as described above. This looping continues until all preparation steps needed to prepare the selected recipe have been performed, at which time decision 615 branches to "no" branch 617 and processing ends at 618.

Figure 10:
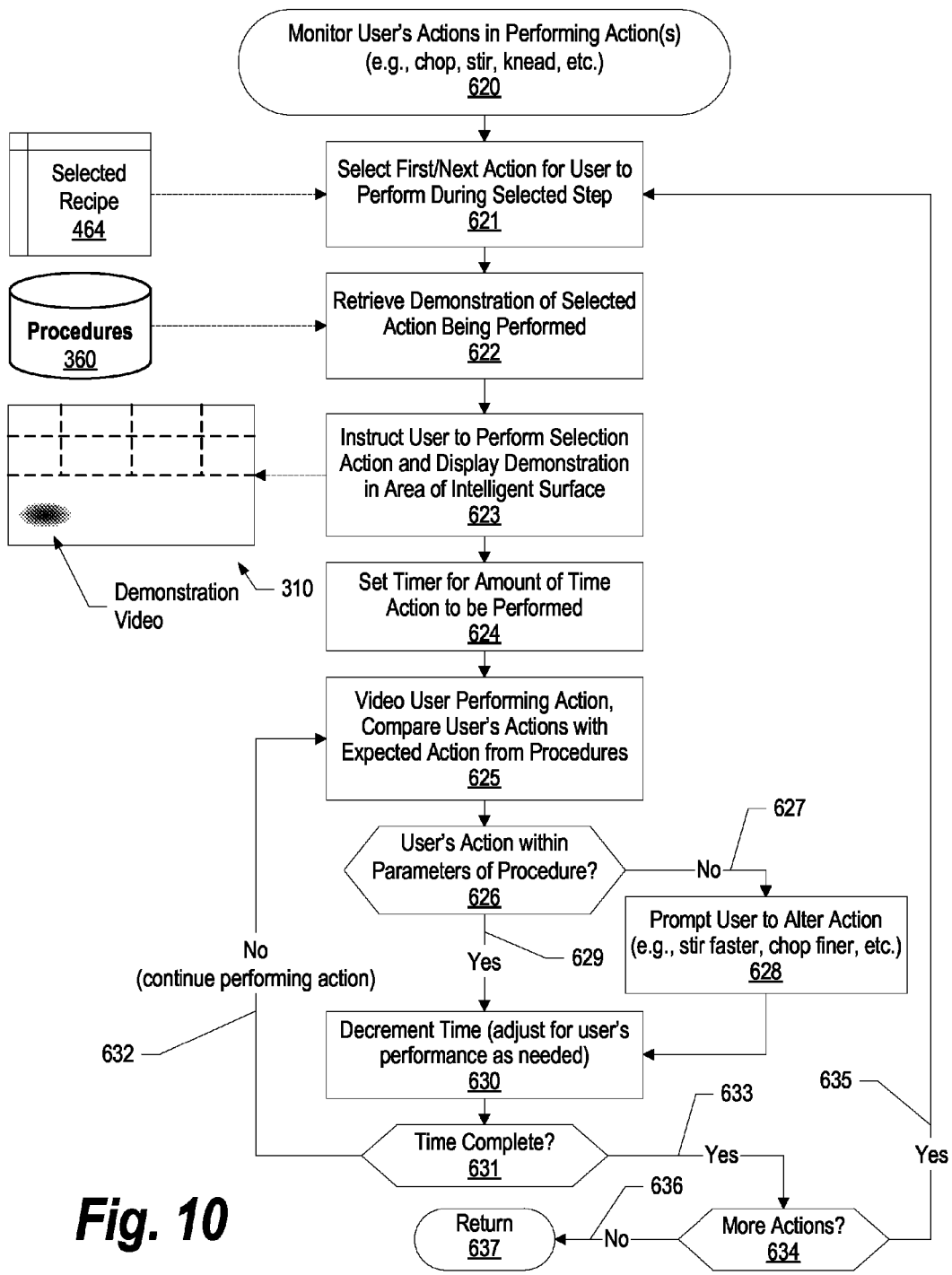
FIG. 10 is a flowchart of the steps taken to monitor a user's actions when following steps in a recipe.

FIG. 10 is a flowchart of the steps taken to monitor a user's actions when following steps in a recipe. Processing commences at 620 whereupon, at step 621 the first step that the user is to perform during the selected preparation step of selected recipe 464 is selected. At step 622, a demonstration of the selection action is retrieved from procedures data store 360. Examples of procedures that could be retrieved include chopping, dicing, kneading, etc. At step 623, the user is instructed to perform the selected action and the retrieved demonstration is presented to the user according to the user's preferences (e.g., visually, audibly, etc.) on interactive cooking preparation device 310. At step 624, a timer is set according to the amount of time the action is to be performed (e.g., "knead the dough for ten minutes," etc.). At step 625, video devices included in the interactive cooking preparation device are used to capture images of the user performing the action. A determination is made as to whether the action being performed by the user fall within acceptable action thresholds (decision 626). If the user's actions do not fall within acceptable action thresholds, then decision 626 branches to "no" branch 627 whereupon, at step 628, the user is prompted to alter the action being performed. Such prompts might include requesting that the user "stir faster," "chop finer," etc. On the other hand, if the user's current actions fall within the performance thresholds for the action, then decision 626 branches to "yes" branch 629 bypassing step 628. At step 630, the timer is decremented. In one embodiment, the timer is also adjusted according to the user's actions. For example, if the user was instructed to stir for five minutes, but it is determined that the user is stirring too slowly, then the timer can be adjusted upwards so that the user stirs the ingredients for a longer period of time. A determination is made as to whether the time is complete for performing the selected action (decision 631). If the time is not complete, then decision 632 branches to "no" branch 632 which loops back to continue monitoring the user's actions and prompt the user to alter the performance as necessary. This looping continues until the time that the action is to be performed is complete, whereupon decision 631 branches to "yes" branch 633. A determination is then made as to whether there are more actions to be performed by the user (decision 634). If there are more actions to be performed by the user, then decision 634 branches to "yes" branch 635 which loops back to select the next action needed to prepare selected recipe 464 and have the user perform the next action as described above. This looping continues until all the actions have been performed, at which time decision 634 branches to "no" branch 636 and processing returns at 637.

Figure 11:
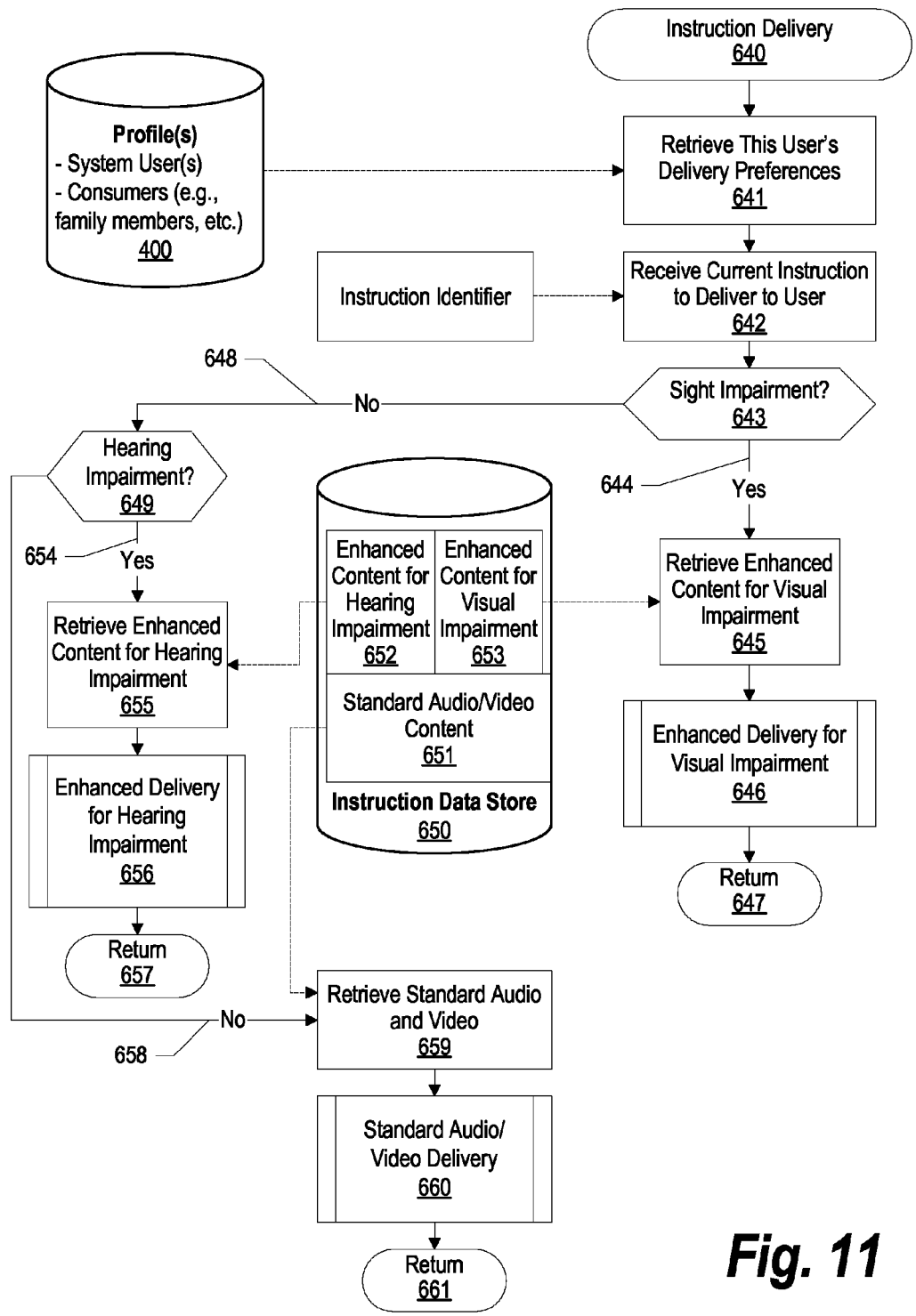
FIG. 11 is a flowchart of the steps taken to deliver instruction material to the user of the interactive cooking preparation device.

FIG. 11 is a flowchart of the steps taken to deliver instruction material to the user of the interactive cooking preparation device. Processing commences at 640 whereupon, at step 641, the user's delivery preference is retrieved from user profiles data store 400. At step 642, an instruction identifier that corresponds with the instruction that is to be provided to the user is received. A determination is made as to whether the user's profile indicates that the user has a sight impairment (decision 643). If the user has a sight impairment, then decision 643 branches to "yes" branch 644 whereupon, at step 645, enhanced content 653 appropriate for a person with a visual impairment is received from instruction data store 650. An example of enhanced content 653 would be audible instructions that are more detailed than audible instructions that accompany a video content file. Another example of enhanced content 653 would be Braille output that would be presented to the user on a Braille output pad included in the interactive cooking preparation device. At step 646, the enhanced content for a person with a vision impairment that was retrieved at step 645 is delivered to the user (e.g., played over speakers, presented on a Braille output pad, etc.). Processing then returns at 647.

Returning to decision 643, if the user does not have a sight impairment, then decision 643 branches to "no" branch 648 whereupon a determination is made as to whether the user has a hearing impairment (decision 649). If the user has a hearing impairment, then decision 649 branches to "yes" branch 654 whereupon, at step 655 enhanced content 652 appropriate for a person with a hearing impairment is received from instruction data store 650. An example of enhanced content 652 would be subtitle text (e.g., Closed Captioning) that would be displayed in conjunction with a video instruction file. Another example of enhanced content 652 would be a detailed textual description displayed on the horizontal display screen of the interactive cooking preparation device. At step 656, the enhanced content for a person with a hearing impairment that was retrieved at step 655 is delivered to the user (e.g., displayed on the horizontal video display of the interactive cooking preparation device, etc.). Processing then returns at 657.

Returning to decision 649, if the user does not have a hearing impairment or a sight impairment, then decision 649 branches to "no" branch 658 whereupon, at step 659 standard audio and video are retrieved from standard audio/video content 651 according to the user's preferences. For example, even though the user is not noted as hearing impaired, the user may request subtitles on the video so that the user can listen to music or other sounds rather than listening to audible instructions. At step 660, the standard content that was retrieved at step 659 are delivered to the user. Processing then returns at 661.

Figure 12:
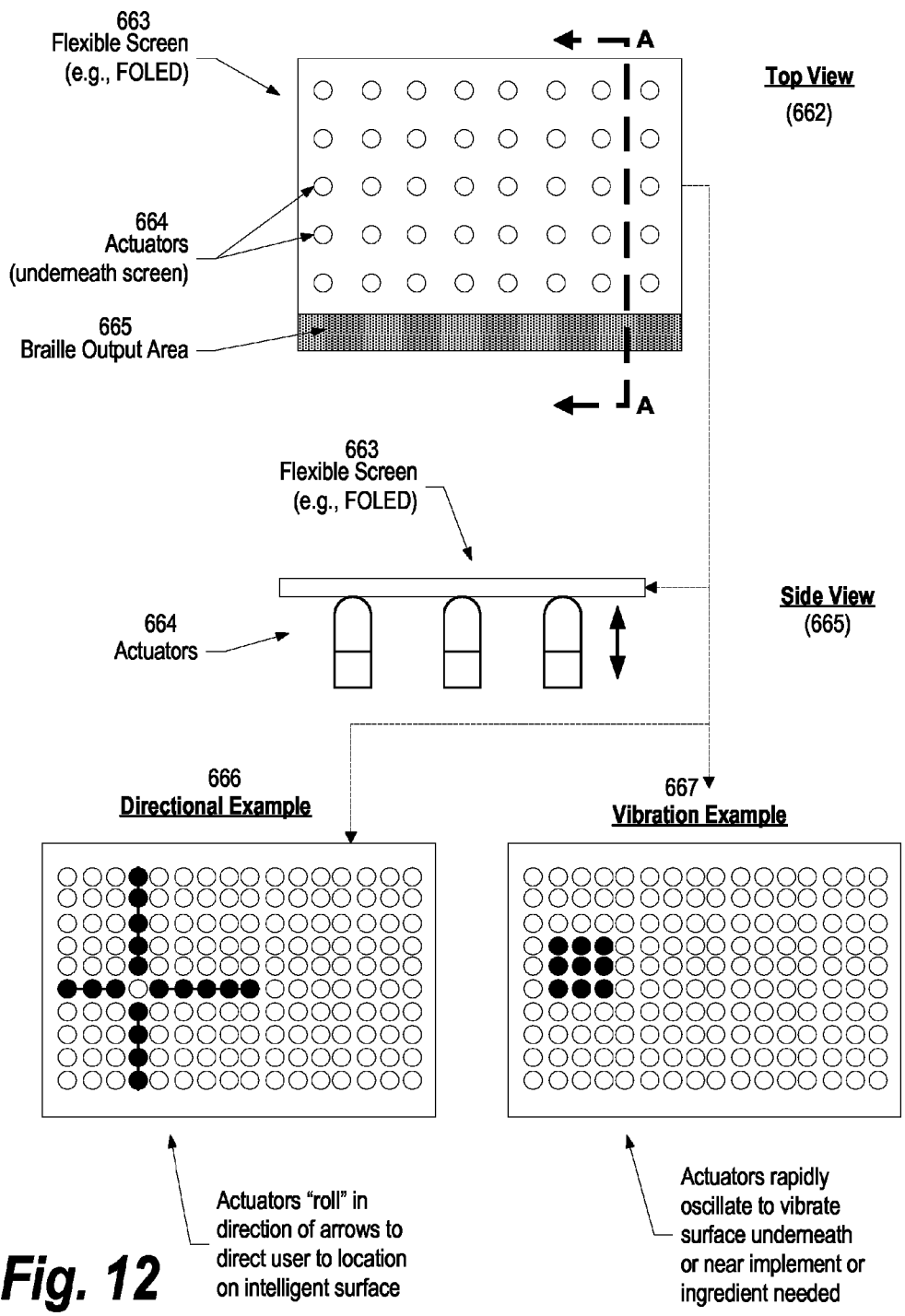
FIG. 12 is a diagram of a flexible horizontal display screen with actuators underneath to provide tactile feedback to a user of the interactive cooking preparation device.

FIG. 12 is a diagram of a flexible horizontal display screen with actuators underneath to provide tactile feedback to a user of the interactive cooking preparation device. Top view 662 of horizontal surface 663 shows placement of multiple actuators 664. In addition, Braille output area 665 is shown with pins that can be actuated to form Braille characters used to communicate with a sight-impaired user. Horizontal surface is a flexible display panel, such as a Flexible Organic Light-Emitting Diode (Flexible OLED or FOLED) display panel. Because of the flexible nature of the horizontal display panel surface, actuators 664 (when activated) press against the underside of flexible screen surface 663 and can be felt by a user that is touching the top of the horizontal surface.

Side view 665 is a partial cross section of flexible horizontal screen surface 663 and three actuators 664. As shown, when actuators 664 are actuated by supplying a current to the actuators, the actuators move upwards and press against the underside of flexible horizontal screen surface 663. Groups of actuators can be actuated in order to highlight an area of the surface or direct a user to an area of the surface.

Directional example 666 is a top view showing sets of actuators that are actuated using a timing delay to simulate a "rolling" effect. In the example shown, the three actuators to the left of the center simulate a rolling effect to the right, the five actuators to the right of the center simulate a rolling effect to the left, the five actuators above the center simulate a downward rolling effect, and the four actuators below the center simulate an upward rolling effect. When operated in this manner, a user touching the surface of the flexible horizontal screen surface will be directed to the center location. Those of skill in the art will appreciate that other directions (e.g., diagonal, etc.), while not shown can also be used in a rolling fashion to direct the user to a particular surface area.

Vibration example 667 is a top view shown a group of actuators that are rapidly actuated in order to produce a vibration effect on a particular area of the flexible horizontal screen surface. If the user was being asked to use an implement that had been placed on the area, then vibrating the area would highlight the area and help the user located the needed implement. This would be particularly useful for a person with a sight disability that is not able to see visual highlights displayed on the flexible horizontal screen surface.

Figure 13:
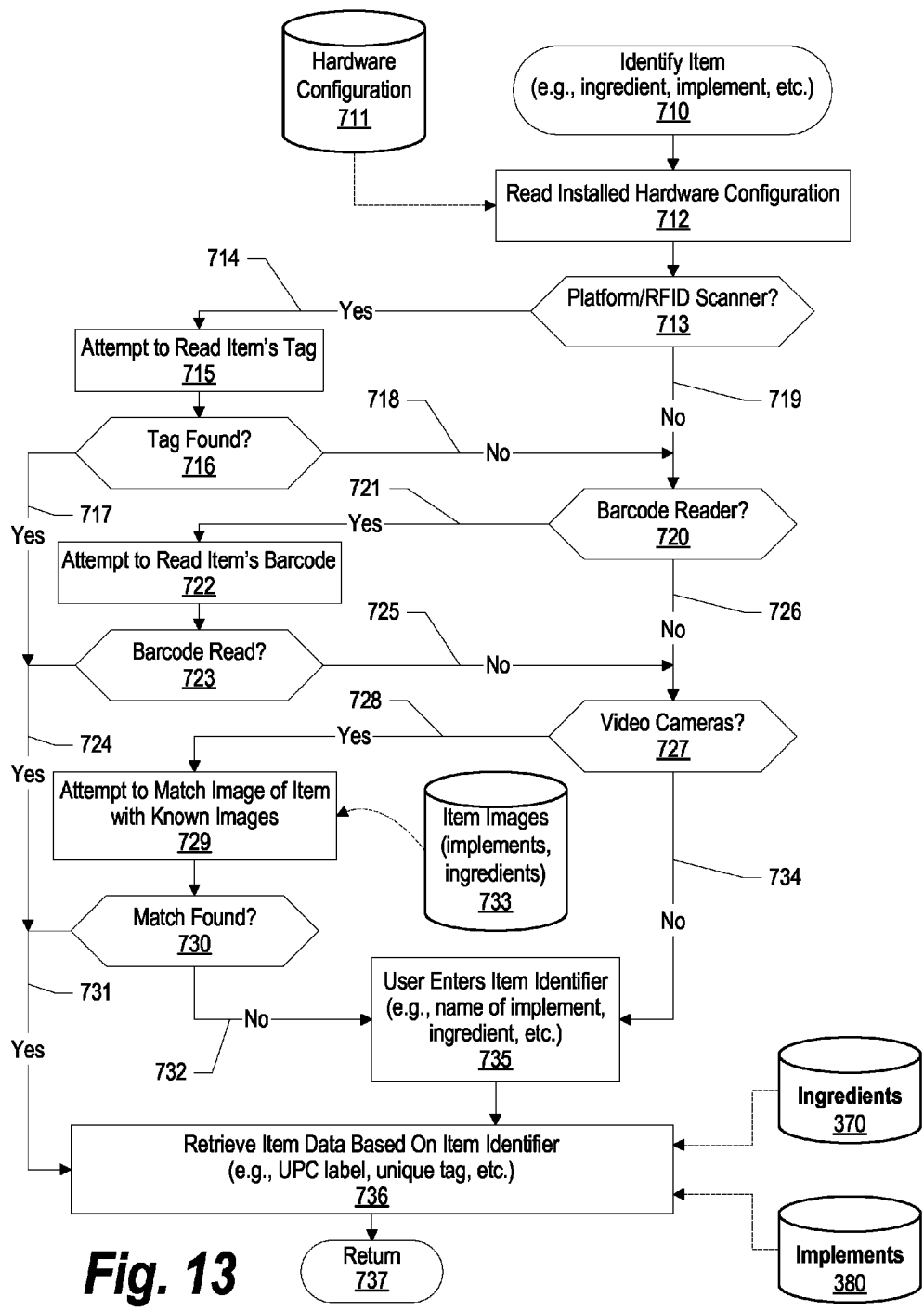
FIG. 13 is a flowchart of the steps taken to identify items using various scanners connected to the interactive cooking preparation device.

FIG. 13 is a flowchart of the steps taken to identify items using various scanners connected to the interactive cooking preparation device. Processing commences at 710 whereupon, at step 712, the hardware configuration of the interactive cooking preparation device is read from hardware configuration data store 711. The hardware configuration data indicates what sensors are installed in the interactive cooking preparation device. One example of an interactive cooking preparation device is a modified Microsoft Surface™ device. This device has platform sensors that can detect particular tags when tagged-items are placed on or proximate to the device's surface. In one embodiment, Radio Frequency Identification (RFID) tags are placed on items and an RFID receivers are located around the interactive cooking preparation device so that RFID-tagged items are identified by the receivers when the items are moved to the surface of the interactive cooking preparation device. A determination is made as to whether platform or RFID scanners are included in the interactive cooking preparation device (decision 713). If such scanners are included in the interactive cooking preparation device, then decision 713 branches to "yes" branch 714 whereupon, at step 715, the scanners are used to attempt to read the item's tag (if a tag has been attached to the item). A determination is made as to whether a tag is detected on the item (decision 716). If a tag is found, then decision 716 branches to "yes" branch 717 whereupon, at step 736, item data is retrieved based on looking up the item's identifier using the sensors and processing returns to the calling routine at 737. On the other hand, if a tag is not found (or cannot be read), then decision 716 branches to "no" branch 718.

If the interactive cooking preparation device does not have a platform or RFID scanner (decision 713 branching to "no" branch 719) or if a tag could not be read using such scanners (decision 716 branching to "no" branch 718), then a determination is made as to whether a barcode reader is installed in the interactive cooking preparation device (decision 720). If a barcode reader is installed in the interactive cooking preparation device, then decision 720 branches to "yes" branch 721 whereupon, at step 722, an attempt is made to read a barcode affixed to the item. A determination is made as to whether the interactive cooking preparation device was able to read a barcode from the item (decision 723). If a barcode was read, then decision 723 branches to "yes" branch 724 whereupon, at step 736 the item data is retrieved based on looking up the item's identifier using the barcode scanner and processing returns to the calling routine at 737. On the other hand, if a barcode could not be read from the item, then decision 723 branches to "no" branch 725.

If the interactive cooking preparation device does not have a barcode scanner (decision 720 branching to "no" branch 726) or if a barcode could not be read using the barcode scanner (decision 723 branching to "no" branch 725), then a determination is made as to whether video input devices are installed in the interactive cooking preparation device (decision 727). If video input devices are installed in the interactive cooking preparation device, then decision 727 branches to "yes" branch 728 whereupon, at step 729, an attempt is made to match an image of the item taken with the video input devices with known images of items retrieved from item images data store 733. A determination is made as to whether a matching item was found in item images data store 733 (decision 730). If a match was found, then decision 730 branches to "yes" branch 731 whereupon, at step 736 the item data is retrieved based on looking up the item's identifier using the matching image and processing returns to the calling routine at 737. On the other hand, the item does not match one of the items in item images data store 733, then decision 730 branches to "no" branch 732.

If the item identifier cannot be detected using a scanner or a video image (either decision 727 branching to "no" branch 734 or decision 730 branching to "no" branch 732), then, at step 735, the user enters the item identifier directly to the interactive cooking preparation device (e.g., using a keyboard attached to the interactive cooking preparation device). This identifier is then used to retrieve the item's data at step 736 and processing returns to the calling routine at 737.

Figure 14:
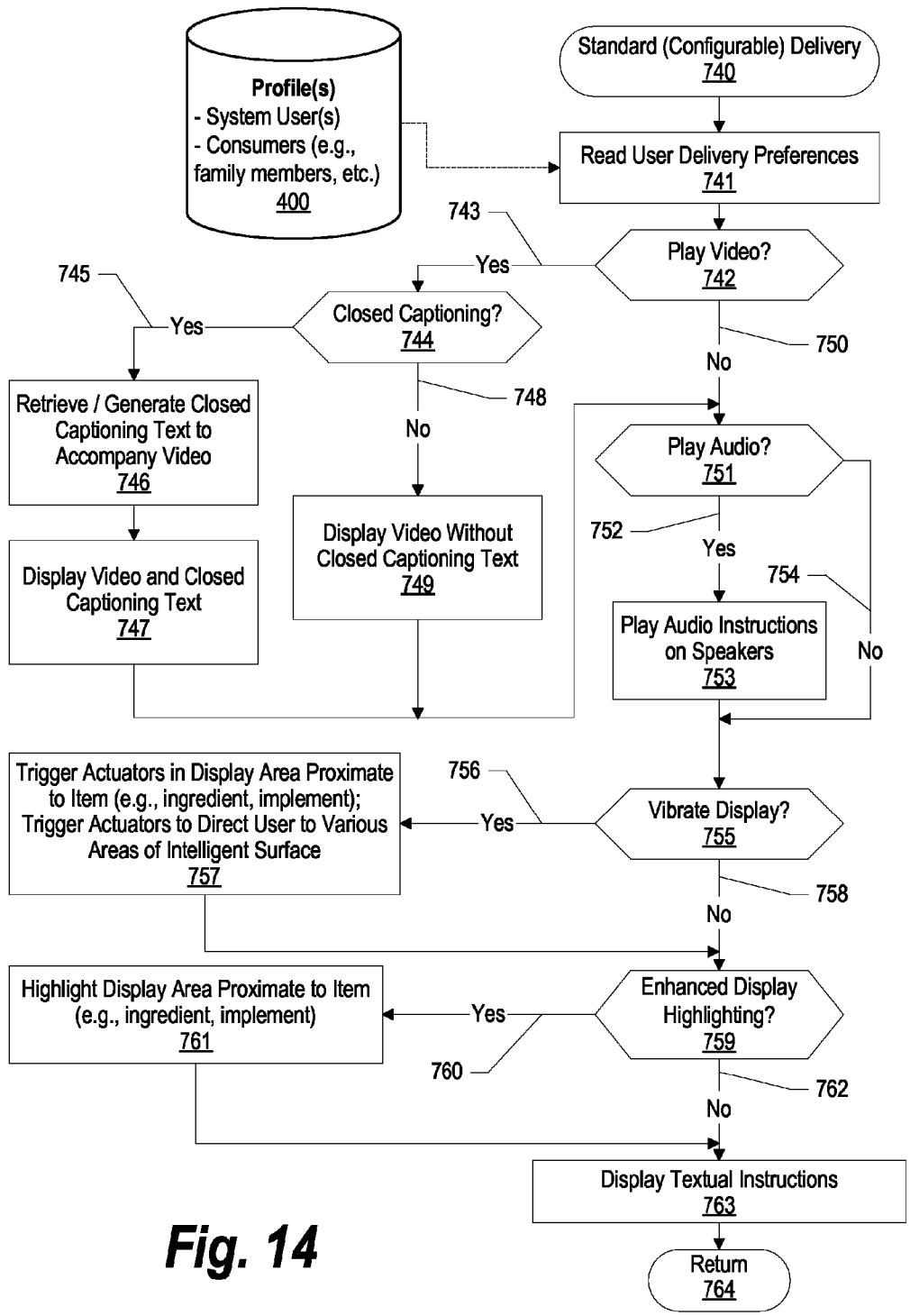
FIG. 14 is a flowchart of the steps taken to provide standard delivery of instructional materials based on user preferences.

FIG. 14 is a flowchart of the steps taken to provide standard delivery of instructional materials based on user preferences. Processing commences at 740 whereupon, at step 741, the interactive cooking preparation device reads the user's delivery preferences stored in profile data store 400. Based on the user's preferences, a determination is made as to whether the play video content to the user on a display screen attached to the interactive cooking preparation device (decision 742). If video content is preferred by the user, then decision 742 branches to "yes" branch 743 whereupon a determination is made as to whether the user also prefers subtitles (e.g., Closed Captioning) to accompany the video playback (decision 744). If subtitles are requested, then decision 744 branches to "yes" branch 745 whereupon at step 746, the subtitles that accompany the video are either retrieved from a data store or generated from the audio track. At step 747, the subtitles are displayed to the user along with the video. On the other hand, if the user does not wish to view subtitles, then decision 744 branches to "no" branch 748 whereupon, at step 749, the video is displayed to the user without subtitles. Returning to decision 742, if the user does not wish to view video content, then decision 742 branches to "no" branch 750 bypassing steps 744 to 749.

A determination is made as to whether the user wishes to hear audio (decision 751). If the user only wishes to receive audio, then decision 751 branches to "yes" branch 752 whereupon, at step 753, the audio instructions are played on the speakers. On the other hand, if the user does not wish to hear audio instructions, then decision 751 branches to "no" branch 754 bypassing step 753.

A determination is made as to whether to vibrate the horizontal display surface proximate to the item of interest (decision 755). If vibration of the display has been requested by the user, then decision 755 branches to "yes" branch 756 whereupon, at step 757, actuators underneath the surface in the area where the item has been placed are actuated causing the surface area to vibrate. On the other hand, if vibration is not desired by the user, then decision 755 branches to "no" branch 758 bypassing step 757.

A determination is made as to whether the user wishes to receive enhanced highlighting on the interactive cooking preparation device's horizontal display (decision 759). If the user wishes to receive enhanced highlighting, then decision 759 branches to "yes" branch 760 whereupon, at step 761, the surface area display proximate to the item of interest (e.g., an ingredient or implement placed on the surface, etc.) is highlighted by displaying images proximate to the item. In one embodiment, the enhanced highlighting is more intense (e.g., brighter, pulsating, etc.) than normal highlighting provided on the horizontal surface area. On the other hand, if enhanced highlighting is not desired, then decision 759 branches to "no" branch 763 bypassing step 761.

After the standard delivery preferences of the user have been processed and content has been delivered to the user in the preferred manner, then processing returns to the calling routine at 764.

Figure 15:
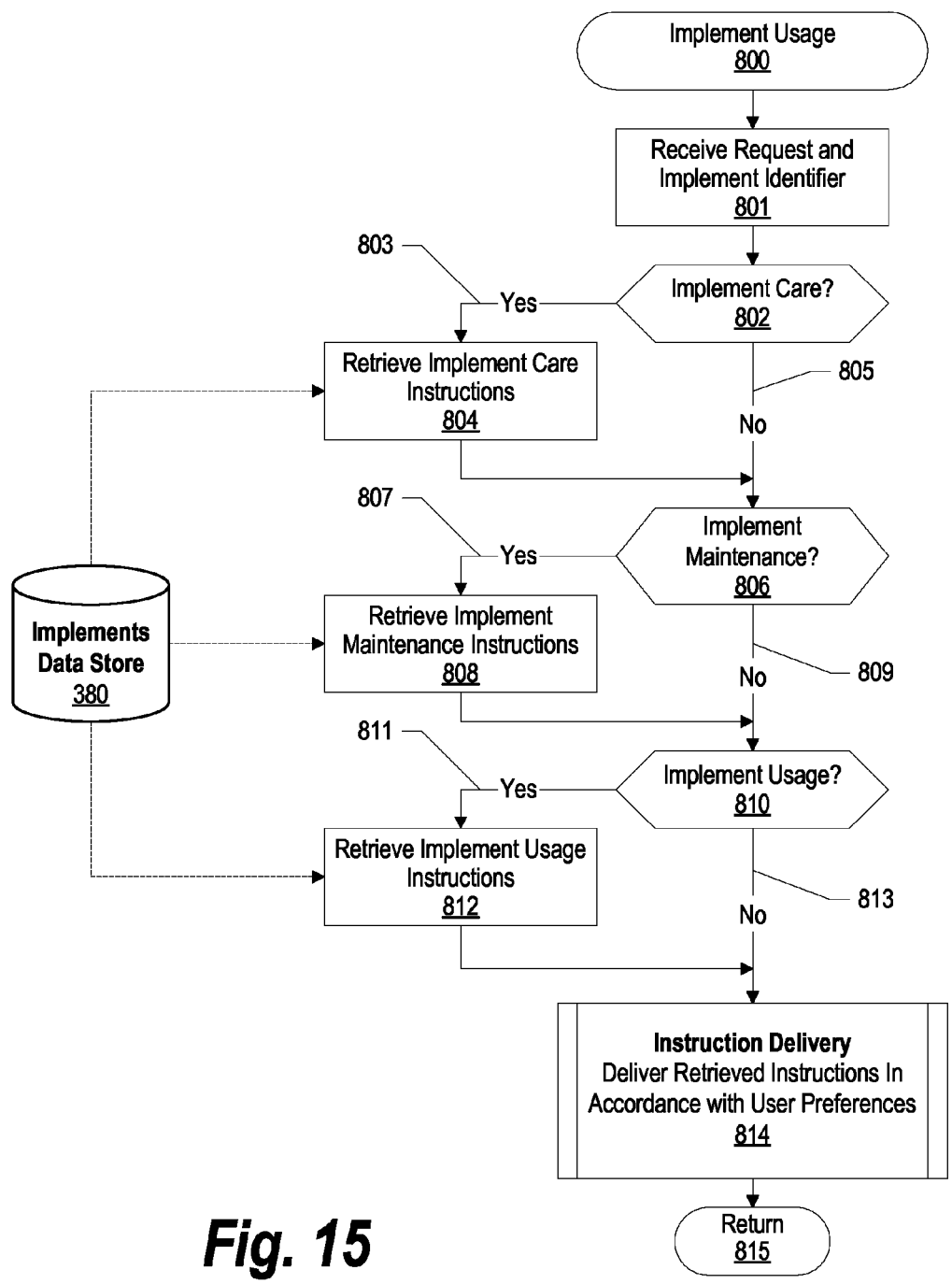
FIG. 15 is a flowchart showing the steps taken to retrieve implement usage instructions and provide the instructions to the user of the interactive cooking preparation device.

FIG. 15 is a flowchart showing the steps taken to retrieve implement usage instructions and provide the instructions to the user of the interactive cooking preparation device. Processing commences at 800 whereupon, at step 801, the routine receives an implement identifier (e.g., identifying a carving knife) and an implement request from the user. A determination is made as to whether the implement request is for implement care instructions (decision 802). If the request is for implement care instructions, then decision 802 branches to "yes" branch 803 whereupon, at step 804, implement care instructions are retrieved from implements data store 380. For example, with a carving knife, the care instructions might include how to properly clean the knife and how to properly store the knife. On the other hand, if the request was not for implement care instructions, then decision 802 branches to "no" branch 805 bypassing step 804.

A determination is made as to whether the implement request is for implement maintenance instructions (decision 806). If the request is for implement maintenance instructions, then decision 806 branches to "yes" branch 807 whereupon, at step 808, implement maintenance instructions are retrieved from implements data store 380. For example, with the carving knife, the maintenance instructions might include how to properly sharpen the knife. On the other hand, if the request was not for implement maintenance instructions, then decision 806 branches to "no" branch 809 bypassing step 808.

A determination is made as to whether the implement request is for implement usage instructions (decision 810). If the request is for implement usage instructions, then decision 810 branches to "yes" branch 811 whereupon, at step 812, implement usage instructions are retrieved from implements data store 380.

For example, with the carving knife, the usage instructions might include how to carve a ham or a turkey. On the other hand, if the request was not for implement usage instructions, then decision 810 branches to "no" branch 813 bypassing step 812.

After the user's implement request has been retrieved, then, at step 814, the retrieved instructions are delivered by the interactive cooking preparation device to the user according to the user's delivery preferences. Processing then returns to the calling routine at 815.

Figure 16:
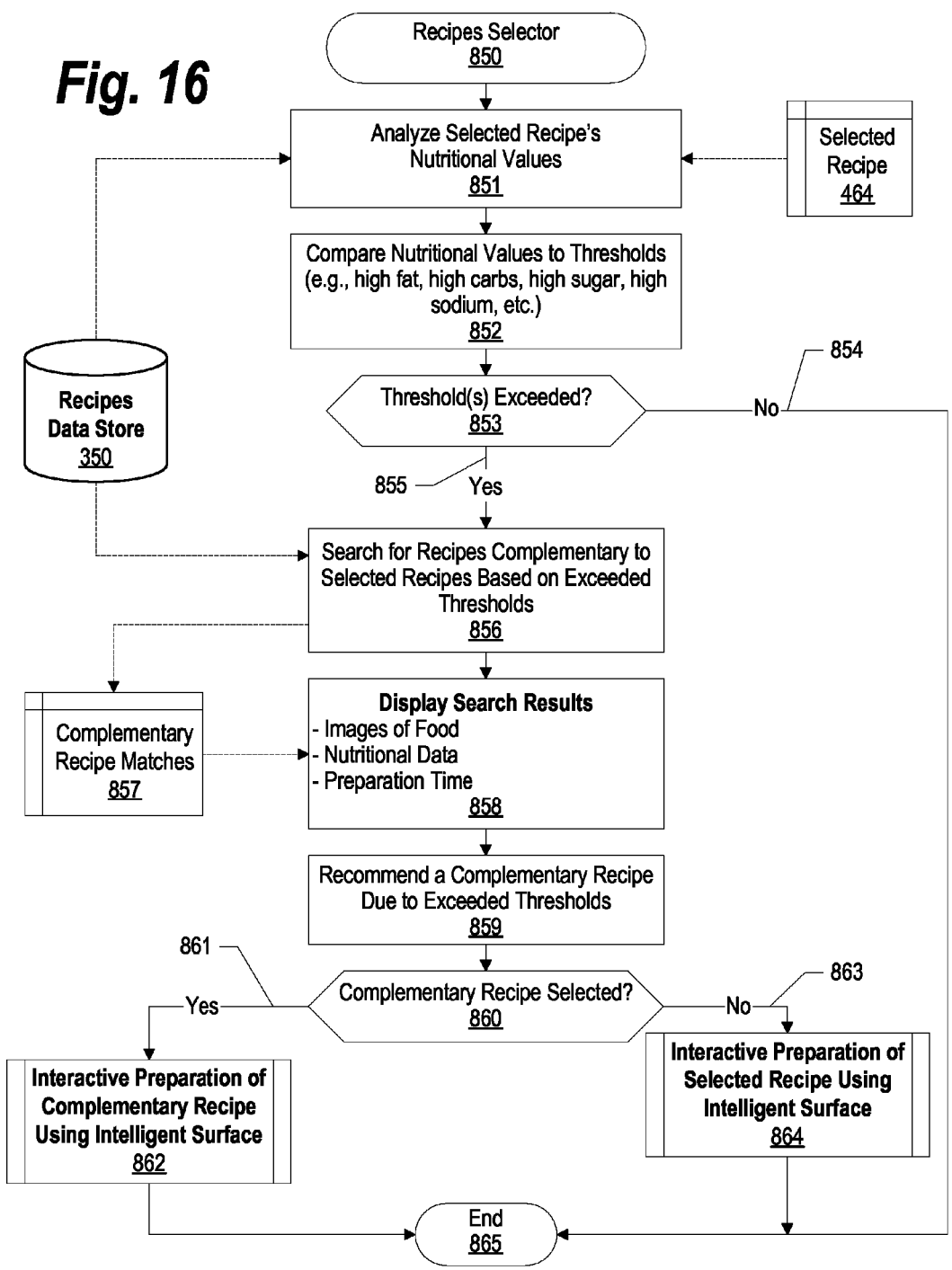
FIG. 16 is a flowchart showing the steps taken to identify and suggest additional recipes that complement a recipe selected by the user of the interactive cooking preparation device.

FIG. 16 is a flowchart showing the steps taken to identify and suggest additional recipes that complement a recipe selected by the user of the interactive cooking preparation device. Processing commences at 850 whereupon, at step 851, nutritional values of selected recipe 464 are retrieved from recipes data store 350 and analyzed. At step 852, the nutritional values of the selected recipe are compared to thresholds that have been set for or by the user. Examples of thresholds may include high fat, high carbohydrates, high sugar, high sodium, etc. A determination is made as to whether one or more nutritional thresholds have been exceeded by the selected recipe (decision 853). If no nutritional thresholds have been exceeded, then decision 853 branches to "no" branch 854 whereupon processing ends at 864.

On the other hand, if one or more nutritional thresholds are exceeded by the selected recipe, then decision 853 branches to "yes" branch 855 whereupon, at step 856, recipes data store 350 is searched for recipes complementary to the selected recipe but that do not exceed the nutritional thresholds. For example, if the user has a nutritional threshold to keep fat content below a certain number of grams and the selected recipe is a "devil's food cake," the search performed at step 856 would return an "angel food cake" as a complementary alternative because both recipes are for cakes, and the "angel food cake" has an acceptable fat content. The complementary recipes resulting from the search performed at step 856 are stored in complementary recipe data store 857. At step 858, the complementary recipes are presented to the user. The presentation can include images of the complementary recipes, nutritional values of the complementary recipes and how the nutritional values compare with selected recipe 464, and preparation details regarding the complementary recipes, including the preparation time needed to prepare the complementary recipe as compared to the selected recipe. At step 859, one or more complementary recipes are recommended to the user due to the fact that the selected recipe exceeded one or more nutritional thresholds. A determination is made as to whether the user selected one of the complementary recipes (decision 860). If the user selects one of the complementary recipes, then decision 860 branches to "yes" branch 861 whereupon, at step 862, the selected recipe is replaced with the selected complementary recipe and interactive preparation instructions are presented by the interactive cooking preparation device to the user to assist in the preparation of the complementary recipe in accordance with the user's instruction delivery preferences. On the other hand, if the user does not select one of the complementary recipes, then decision 860 branches to "no" branch 863 whereupon, at step 864, interactive preparation instructions are presented by the interactive cooking preparation device to the user to assist in the preparation of the selected recipe in accordance with the user's instruction delivery preferences. Processing thereafter ends at 865.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    selecting, by a user, a recipe from a plurality of recipes;
    retrieving, from a data store, a plurality of preparation steps corresponding to the selected recipe;
    sequentially displaying each of the plurality of retrieved preparation steps to the user on a horizontal surface display included in an interactive cooking preparation device;
    identifying a current preparation step being performed by the user, wherein the current preparation step requires the user to use an item placed in a selected area of the horizontal surface display; and
    in response to the identifying, directing the user to the selected area of the horizontal surface display where the item is placed using a tactile feedback mechanism, wherein the tactile feedback mechanism causes a physical sensation on the horizontal surface display of the interactive cooking preparation device, wherein the physical sensation is felt by the user when touching the horizontal surface display of the interactive cooking preparation device, and wherein the physical sensation guides the user to find the item.

2. The method of claim 1 wherein the tactile feedback mechanism includes a plurality of actuators located beneath a flexible screen surface, wherein the method further comprises:
    selecting one or more of the plurality of actuators; and
    sending a signal to the selected actuators, wherein the signal causes the selected actuators to actuate.

3. The method of claim 2 wherein the horizontal surface display is the flexible screen surface and the method further comprises:
    displaying instructions to the user that coincide with the tactile feedback mechanism that directs the user to the selected area of the horizontal surface display.

4. The method of claim 2 wherein the physical sensation is a rolling sensation, the method further comprising:
    selecting a group of the actuators that are aligned in a geometric pattern; and
    signaling the selected group of actuators using a time delay between a first of the selected group of actuators and a second of the selected group of actuators.

5. The method of claim 4 further comprising:
    displaying, on the flexible screen surface, a visual image directing the user to a particular direction that coincides with the rolling sensation.

6. The method of claim 2 further comprising:
    selecting a group of the actuators that are proximate to the selected area of the horizontal surface display; and
    vibrating the selected group of actuators based on the signal sent to the selected group of actuators.

7. The method of claim 6 further comprising:
    displaying, on the flexible screen surface, a visual image that highlights an area of the flexible screen surface that is proximate to the selected group of actuators.

8. An information handling system comprising:
    one or more processors;
    a memory accessible by at least one of the processors;
    a flexible horizontal display surface accessible by at least one of the processors;
    a plurality of actuators located underneath the flexible horizontal display surface that are accessible by at least one of the processors;
    a nonvolatile storage device accessible by at least one of the processors;
    one or more data stores stored in the memory, wherein the data stores include a plurality of recipes and a plurality of preparation steps corresponding to one or more of the recipes; and
    a set of instructions which are loaded into the memory and executed by at least one of the processors in order to perform actions of:
        selecting, by a user, a selected recipe from the plurality of recipes;
        retrieving, from one of the data stores, a selected plurality of preparation steps corresponding to the selected recipe;
        sequentially displaying each of the selected plurality of retrieved preparation steps to the user on the flexible horizontal display surface;
        identifying a current preparation step being performed by the user, wherein the current preparation step requires the user to use an item placed in a selected area of the flexible horizontal display surface; and
        in response to the identifying, actuating one or more of the actuators in order to direct the user to the selected area of the flexible horizontal display surface using a tactile feedback mechanism, wherein the tactile feedback mechanism causes a physical sensation on the flexible horizontal display surface of the interactive cooking preparation device, wherein the physical sensation is felt by the user when touching the flexible horizontal display surface, and wherein the physical sensation guides the user to find the item.

9. The information handling system of claim 8 wherein the instructions executed by at least one of the processors perform additional actions comprising:
    selecting one or more of the plurality of actuators; and
    sending a plurality of signals to the selected actuators, wherein the signals causes the selected actuators to actuate.

10. The information handling system of claim 9 wherein the instructions executed by at least one of the processors perform additional actions comprising:
    displaying, on the flexible horizontal display surface, instructions to the user that coincide with the tactile feedback mechanism that directs the user to the selected area of the flexible horizontal display surface.

11. The information handling system of claim 9 wherein the physical sensation is a rolling sensation, and wherein the instructions executed by at least one of the processors perform additional actions comprising:
  selecting a group of the actuators that are aligned in a geometric pattern; and
  signaling the selected group of actuators using a time delay between a first of the selected group of actuators and a second of the selected group of actuators.

12. The information handling system of claim 11 wherein the instructions executed by at least one of the processors perform additional actions comprising:
  displaying, on the flexible horizontal display surface, a visual image directing the user to a particular direction that coincides with the rolling sensation.

13. The information handling system of claim 9 wherein the instructions executed by at least one of the processors perform additional actions comprising:
  selecting a group of the actuators that are proximate to the selected area of the flexible horizontal display surface; and
  vibrating the selected group of actuators by oscillating the signal sent to the selected group of actuators.

14. The information handling system of claim 13 wherein the instructions executed by at least one of the processors perform additional actions comprising:
  displaying, on the flexible horizontal display surface, a visual image that highlights an area of the flexible screen surface that is proximate to the selected group of actuators.

15. A computer program product stored in a non-transitory computer readable medium, comprising functional descriptive material that, when executed by an information handling system, causes the information handling system to perform actions that include:
  selecting, by a user, a recipe from a plurality of recipes;
  retrieving, from a data store, a plurality of preparation steps corresponding to the selected recipe;
  sequentially displaying each of the plurality of retrieved preparation steps to the user on a horizontal surface display included in an interactive cooking preparation device;
  identifying a current preparation step being performed by the user, wherein the current preparation step requires the user to use an item placed in a selected area of the horizontal surface display; and
  in response to the identifying, directing the user to the selected area of the horizontal surface display where the item is placed using a tactile feedback mechanism, wherein the tactile feedback mechanism causes a physical sensation on the horizontal surface display of the interactive cooking preparation device, wherein the physical sensation is felt by the user when touching the horizontal surface display of the interactive cooking preparation device, and wherein the physical sensation guides the user to find the item.

16. The computer program product of claim 15 wherein the tactile feedback mechanism includes a plurality of actuators located beneath a flexible screen surface and further comprising functional descriptive material that causes the information handling system to perform additional actions that include:
  selecting one or more of the plurality of actuators; and
  sending a signal to the selected actuators, wherein the signal causes the selected actuators to actuate.

17. The computer program product of claim 16 wherein the horizontal surface display is the flexible screen surface and further comprising functional descriptive material that causes the information handling system to perform additional actions that include:
  displaying instructions to the user that coincide with the tactile feedback mechanism that directs the user to the selected area of the horizontal surface display.

18. The computer program product of claim 16 wherein the physical sensation is a rolling sensation and further comprising functional descriptive material that causes the information handling system to perform additional actions that include:
  selecting a group of the actuators that are aligned in a geometric pattern; and
  signaling the selected group of actuators using a time delay between a first of the selected group of actuators and a second of the selected group of actuators.

19. The computer program product of claim 18 further comprising functional descriptive material that causes the information handling system to perform additional actions that include:
  displaying, on the flexible screen surface, a visual image directing the user to a particular direction that coincides with the rolling sensation.

20. The computer program product of claim 16 further comprising functional descriptive material that causes the information handling system to perform additional actions that include:
  selecting a group of the actuators that are proximate to the selected area of the horizontal surface display; and
  vibrating the selected group of actuators based on the signal sent to the selected group of actuators.

* * * * *